(12) United States Patent
Ha et al.

(10) Patent No.: US 12,442,909 B2
(45) Date of Patent: Oct. 14, 2025

(54) METHOD AND DEVICE FOR PERFORMING UWB RANGING

(71) Applicant: Samsung Electronics Co., Ltd., Suwon-si (KR)

(72) Inventors: Taeyoung Ha, Suwon-si (KR); Mingyu Lee, Suwon-si (KR); Sooyeon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 17/837,645

(22) Filed: Jun. 10, 2022

(65) Prior Publication Data

US 2022/0397659 A1    Dec. 15, 2022

(30) Foreign Application Priority Data

Jun. 11, 2021    (KR) .................... 10-2021-0076356
Jul. 9, 2021    (KR) .................... 10-2021-0090443

(51) Int. Cl.
*G01S 13/02*    (2006.01)
*H04W 4/80*    (2018.01)
(Continued)

(52) U.S. Cl.
CPC ........... *G01S 13/0209* (2013.01); *H04W 4/80* (2018.02); *H04W 48/16* (2013.01); *H04W 80/10* (2013.01)

(58) Field of Classification Search
CPC ....... G01S 13/0209; H04W 4/80; H04W 8/16; H04W 80/10
(Continued)

(56) References Cited

U.S. PATENT DOCUMENTS

2018/0267162 A1    9/2018    Olson et al.
2019/0135229 A1*   5/2019    Ledvina ............... H04W 12/50
(Continued)

FOREIGN PATENT DOCUMENTS

| EP | 3826381 A1 * | 5/2021 | ........... H04B 1/7073 |
| WO | WO-2017109571 A1 * | 6/2017 | ........... H04W 28/16 |
| WO | 2019/067105 A1 | 4/2019 | |

OTHER PUBLICATIONS

Bottigliero et al. "A Low-Cost Indoor Real-Time Locating System Based on TDOA Estimation of UWB Pulse Sequences," IEEE Transactions on Instrumentation and Measurement, vol. 70, 2021 (Year: 2021).*

(Continued)

*Primary Examiner* — William Kelleher
*Assistant Examiner* — Samarina Makhdoom
(74) *Attorney, Agent, or Firm* — Jefferson IP Law, LLP

(57) ABSTRACT

A method for providing bi-directional ultra-wide band (UWB) ranging is provided. The method by a first ultra-wide band (UWB) device includes transmitting an initiation message for initiating UWB ranging, receiving at least one device access message from at least one second UWB device within a contention period, transmitting at least one reply message, receiving at least one device reply message corresponding to the at least one reply message from one or more of the at least one second UWB device, and transmitting, to the one or more second UWB device, a final message based on UWB ranging performed using the device access message, the reply message, and the device reply message.

18 Claims, 21 Drawing Sheets

(51) Int. Cl.
*H04W 48/16* (2009.01)
*H04W 80/10* (2009.01)

(58) Field of Classification Search
USPC .......................................................... 342/22
See application file for complete search history.

(56) References Cited

U.S. PATENT DOCUMENTS

| | | | |
|---|---|---|---|
| 2020/0182996 A1* | 6/2020 | Lee ...................... | G01S 13/785 |
| 2020/0183000 A1 | 6/2020 | Li et al. | |
| 2021/0072373 A1* | 3/2021 | Schoenberg .......... | G01S 13/878 |
| 2021/0076163 A1* | 3/2021 | Burowski ............... | H04W 4/08 |
| 2021/0173064 A1 | 6/2021 | Yoon et al. | |

OTHER PUBLICATIONS

International Search Report and Written Opinion dated Sep. 6, 2022, issued in International Patent Application No. PCT/KR2022/008260.
European Search Report dated Jul. 5, 2024, issued in European Application No. 22820624.9-1206.
European Office Action dated Mar. 25, 2025, issued in European Application No. 22820624.9-1206.
European Search Report dated Sep. 16, 2025, issued in European Application No. 22 820 624.9.

* cited by examiner

| Parameter | Size (bits) | Notes |
| --- | --- | --- |
| Message ID | 8 | 0x01: Gate Initiation Message |
| Serivce protocol version | 16 | Applet protocol version of smart gate transaction which used at this Gate |
| Slot length | 8 | Number of DAM slots for multiple user access (i.e., N) (The range of this field shall not exceed 23 (i.e., 0x01 ~ 0x17)) |
| Slot status | 8 | Bit mask for slots for DAMs 0b0: Empty 0b1: Occupied |
| Slot information list | 40 * N | Information for each slot for DAM |

FIG. 13A

| Parameter | Size (bits) | Notes |
| --- | --- | --- |
| Access condition | 8 | Access condition for the slot 0b0..000: No access condition applied. Every device can try to access. 0b0..001 ~ 0b1111: allowed distance between the gate and the device to send a DAM as response of this GIM, where allowed distance is calculated as follow: allowed distance = (0.05 * Access Condition) meter. The default value is 0b0001. |
| Target mobile device ID | 32 | Identification of Mobile Device that occupies the slot For empty slot, this field is set to 0 |

FIG. 13B

| Parameter | Size (bits) | Notes |
|---|---|---|
| Message ID | 8 | 0x02: Device Access Message |
| Serivce protocol version | 16 | Applet protocol version of the mobile device |
| Reply time | 32 | Reply time for DS-TWR |
| Data length | 8 | Length of Data field in byte |
| Data | 0 ~116 * 8 | Additional data for the Service Protocol |

| Parameter | Size (bits) | Notes |
|---|---|---|
| Message ID | 8 | 0x02: Device Access Message |
| Device ID | 32 | Identification of Mobile Device |
| Service Protocol Version | 16 | Applet protocol version of the mobile device |
| Reply Time | 32 | Reply time for DS-TWR |
| Data Length | 8 | Length of Data filed in byte |
| Data | 0 ~112 * 8 | Additional data for the Service Protocol |

| Parameter | Size (bits) | Notes |
| --- | --- | --- |
| Message ID | 8 | 0x03: Gate Reply Message |
| Serivce protocol version | 16 | Version for Service Protocol which used at this Gate |
| Slot length | 8 | 0x00: Indicator that this GRM is from the sub anchor<br>0x01~0x17: Number of DAM slots for multiple user access (i.e., N of the Reply time list) |
| Slot status | 16 | Bit mask for slots for DAMs<br>0b0: Receiving DAM unsuccessfully<br>0b1: Receiving DAM successfully |
| First round trip time | 32 | Round-trip time btw GIM and the first successful DAM |
| Reply time list | 32 * N | List of reply time for mobile devices |

FIG. 15A

| Parameter | Size (bits) | Notes |
| --- | --- | --- |
| Reply time | 32 | Reply time for a Mobile Device 0x00 for empty slot |

FIG. 15B

| Parameter | Size (bits) | Notes |
|---|---|---|
| Message ID | 8 | 0x04: Device Reply Message |
| Device ID | 32 | Identification of Mobile Device |
| First round trip time | 32 | Round-trip tim btw DAM of this Mobile Device and the first GRM |
| Gate anchor number | 8 | Number of anchors at the gate (i.e., k of the reply time list) k shall not excceed 2. |
| Reply time list | 32*K | List of reply time for the Gate for each GRM |
| Data length | 8 | Length of Data field in byte |
| Data | 0 ~ (111- 4 * k ) * 8 | Additional data for the Service Protocol |

FIG. 16A

| Parameter | Size (bits) | Notes |
|---|---|---|
| Reply time | 32 | Reply time for the nth GRM |

FIG. 16B

| Parameter | Size (bits) | Notes |
|---|---|---|
| Message ID | 8 | 0x05: Gate Final Message |
| Device ID | 32 | Identification of Mobile Device |
| Result | 32 | Result enumeration of UWB ranging<br>0x00: You are in range<br>0x01: Not in range, the occupied slot will be released in next round |
| Data length | 8 | Length of Data field in byte |
| Data | 0 ~ 115 * 8 | Additional data for the Service Protocol |

FIG. 17

METHOD AND DEVICE FOR PERFORMING UWB RANGING

CROSS-REFERENCE TO RELATED APPLICATION(S)

This application is based on and claims priority under 35 U.S.C. § 119(a) of a Korean patent application number 10-2021-0076356, filed on Jun. 11, 2021, in the Korean Intellectual Property Office, and of a Korean patent application number 10-2021-0090443, filed on Jul. 9, 2021, in the Korean Intellectual Property Office, the disclosure of each of which is incorporated by reference herein in its entirety.

BACKGROUND

1. Field

The disclosure relates to ultra-wide band (UWB) communication. More particularly, the disclosure relates to a method and device for UWB ranging.

2. Description of Related Art

The Internet is evolving from a human-centered connection network in which humans create and consume information to an Internet of things (IoT) in which information is exchanged and processed between distributed components such as objects. Internet of everything (IoE) technology is also emerging and is a combination of a big data processing technology based on a connection to a cloud server and the IoT technology. To implement the IoT, technology elements such as sensing technology, wired/wireless communication and network infrastructure, service interface technology, and security technology are important. Recently, technologies such as a sensor network, machine to machine (M2M), and machine type communication (MTC) have been studied for connection between objects.

In the IoT environment, an intelligent Internet technology (IT) service that collects and analyzes data generated from connected objects and thus creates new values in human life may be provided. The IoT may find its applications in the fields of smart home, smart building, smart city, smart car or connected car, smart grid, healthcare, smart home appliance, advanced medical service, and so on through convergence and merging between the existing information technology and various industries.

As various services may be provided along with the development of wireless communication systems, a method of effectively providing these services does not exist in the prior art and therefore is required. For example, a ranging technique for measuring a distance between electronic devices by using UWB may be used.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an example system architecture, example out-of-band (OOB) procedure (e.g., Bluetooth Low Energy (BLE) procedure), ranging procedure, and transaction procedure for providing an ultra-wide band (UWB) service for multiple users, e.g., the gate system.

Another aspect of the disclosure is to provide a ranging block structure, a message format, a message flow, and a media access control (MAC) protocol for supporting multiple access by multiple unspecified users, that is, contention-based multiple access.

Additional aspects will be set forth in part in the description which follows and, in part, will be apparent from the description, or may be learned by practice of the presented embodiments.

In accordance with an aspect of the disclosure, a method by a first ultra-wide band (UWB) device is provided. The method includes transmitting an initiation message for initiating UWB ranging, receiving at least one device access message from at least one second UWB device within a contention period, transmitting at least one reply message, receiving at least one device reply message corresponding to the at least one reply message from one or more of the at least one second UWB device, and transmitting, to the one or more second UWB device, a final message based on UWB ranging performed using the device access message, the reply message, and the device reply message. The initiation message may include information about a length of the contention period, information about a state of a ranging slot included in the contention period, and information about an access condition of the ranging slot.

In accordance with another aspect of the disclosure, a method by a second UWB device is provided. The method includes receiving an initiation message for initiating UWB ranging from a first UWB device, transmitting a device access message to the first UWB device within a contention period, receiving at least one reply message from the first UWB device, transmitting, to the first UWB device, a device reply message based on UWB ranging performed using the initiation message, the device access message, and the reply message, and receiving a final message from the first UWB device. The initiation message may include information about a length of the contention period, information about a state of a ranging slot included in the contention period, and information about an access condition of the ranging slot.

It is possible to efficiently provide a service for multiple users through a scheme for providing a UWB service according to the disclosure. It is possible to provide an efficient UWB service by providing bi-directional ranging according to the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in connection with the accompanying drawings, in which:

FIGS. 13A, 13B, and 13C illustrate a message structure of an initiation message (IM) according to various embodiments of the disclosure;

FIG. 14A illustrates a message structure of a device access message (DAM) according to an embodiment of the disclosure;

FIGS. 15A and 15B illustrate a message structure of a reply message (RM) message according to various embodiments of the disclosure;

FIGS. 16A and 16B illustrate a message structure of a device reply message (DRM) according to various embodiments of the disclosure;

FIG. 17 illustrates a message structure of a final message (FM) according to an embodiment of the disclosure;

Throughout the drawings, it should be noted that like reference numbers are used to depict the same or similar elements, features, and structures.

DETAILED DESCRIPTION

Figure 1:
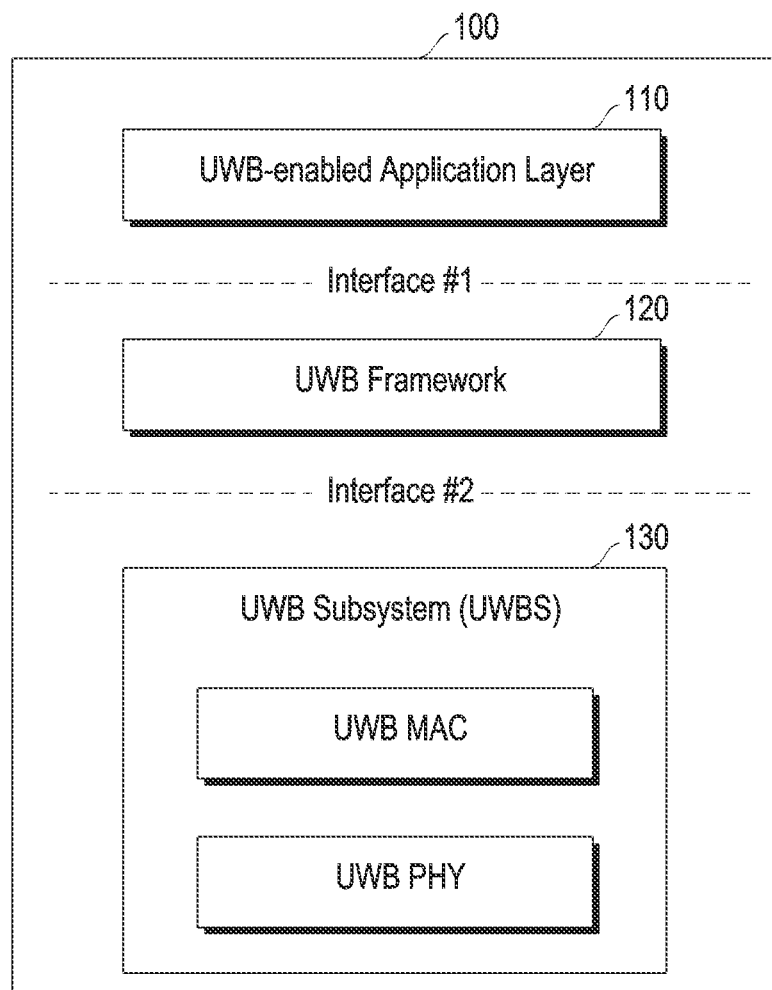
FIG. 1 illustrates an example architecture of an ultra-wide band (UWB) device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more central processing units (CPUs) in a device or a security multimedia card. According to embodiments, a " . . . unit" may include one or more processors.

As used herein, the term 'terminal' or 'device' may also be referred to as a mobile station (MS), user equipment (UE), user terminal (UT), terminal, wireless terminal, access terminal (AT), subscriber unit, subscriber station (SS), wireless device, wireless communication device, wireless transmit/receive unit (WTRU), mobile node, or mobile or may be referred to in other terms. Various embodiments of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, the terminal may include a machine to machine (M2M) terminal and a machine-type communication (MTC) terminal/device, but is not limited thereto. In the disclosure, the terminal may be referred to as an electronic device or simply as a device.

Hereinafter, the operational principle of the disclosure is described below with reference to the accompanying drawings. When determined to make the subject matter of the disclosure unclear, the detailed of the known functions or configurations may be skipped. The terms as used herein are defined considering the functions in the disclosure and may be replaced with other terms according to the intention or practice of the user or operator. Therefore, the terms should be defined based on the overall disclosure.

Hereinafter, embodiments of the disclosure are described in detail with reference to the accompanying drawings. Further, although a communication system using UWB is described in connection with embodiments of the disclosure, as an example, embodiments of the disclosure may also apply to other communication systems with similar technical background or features. For example, a communication system using Bluetooth or ZigBee may be included therein. Further, embodiments of the disclosure may be modified in such a range as not to significantly depart from the scope of the disclosure under the determination by one of ordinary skill in the art and such modifications may be applicable to other communication systems.

When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

In general, wireless sensor network technology is largely divided into a wireless local area network (WLAN) technology and a wireless personal area network (WPAN) technology according to the recognition distance. In this case, WLAN is a technology based on Institute of Electrical and Electronics Engineers (IEEE) 802.11 which facilitates access to the backbone network within a radius of about 100 m. WPAN is a technology based on IEEE 802.15 which includes Bluetooth, ZigBee, and ultra-wide band (UWB). A wireless network in which such a wireless network technology is implemented may include a plurality of electronic devices.

UWB may refer to a short-range high-rate wireless communication technology using a wide frequency band of several gigahertz (GHz) or more, low spectral density, and short pulse width (e.g., 1 nsec to 4 nsec) in a baseband state. UWB may mean a band itself to which UWB communication is applied. UWB may enable secure and accurate ranging between devices. Thus, UWB facilitates relative location estimation based on the distance between two devices or accurate location estimation of a device based on the distance from fixed devices (whose locations are known).

The terminology used herein is provided for a better understanding of the disclosure, and changes may be made thereto without departing from the technical spirit of the disclosure.

The terminology used herein is provided for a better understanding of the disclosure, and changes may be made thereto without departing from the technical spirit of the disclosure.

"Application dedicated file (ADF)" may be, e.g., a data structure in an application data structure that may host an application or application specific data.

"Application protocol data unit (APDU)" may be a command and a response used when communicating with the application data structure in the UWB device.

"Application specific data" may be, e.g., a file structure having a root level and an application level including UWB controllee information and UWB session data required for a UWB session.

"Controller" may be a ranging device that defines and controls ranging control messages (RCM) (or control messages). The controller may define and control ranging features by sending the control message.

"Controllee" may be a ranging device using a ranging parameter in the RCM (or control message) received from the controller. The controlee may utilize the ranging features as configured via the control message from the controller.

Unlike "static scrambled timestamp sequence (STS)," "dynamic STS mode" may be an operation mode in which the STS is not repeated during a ranging session. In this mode, the STS may be managed by the ranging device, and the ranging session key that generates STS may be managed by a secure component.

"Applet" may be, e.g., an applet executed on the secure component including UWB parameters and service data. In this disclosure, Applet may be a FiRa Applet.

"Ranging Device" may be a device capable of performing UWB ranging. In the disclosure, the Ranging Device may be an Enhanced Ranging Device (ERDEV) defined in IEEE 802.15.4z or a FiRa Device. The Ranging Device may be referred to as a UWB device.

"UWB-enabled Application" may be an application for UWB service. For example, the UWB-enabled Application may be an application using a Framework application programming interface (API) for configuring an out-of-band (OOB) Connector, a Secure Service, and/or a UWB service for a UWB session. In this disclosure, "UWB-enabled Application" may be abbreviated as an application or a UWB application. UWB-enabled Application may be a FiRa-enabled Application.

"Framework" may be a component that provides access to Profiles, individual-UWB settings and/or notifications. "Framework" may be, e.g., a collection of logical software components including Profile Manager, OOB Connector, Secure Service, and/or UWB service. In the disclosure, the Framework may be a FiRa Framework.

"OOB Connector" may be a software component for establishing an out-of-band (OOB) connection (e.g., a Bluetooth low energy (BLE) connection) between Ranging Devices. In the disclosure, the OOB Connector may be a FiRa OOB Connector.

"Profile" may be a previously defined set of UWB and OOB configuration parameters. In the disclosure, Profile may be a FiRa Profile.

"Profile Manager" may be a software component that implements a profile available on the Ranging Device. In the disclosure, the Profile Manager may be a FiRa Profile Manager.

"Service" may be an implementation of a use case that provides a service to an end-user.

"Smart Ranging Device" may be a ranging device that may implement an optional Framework application programming interface (API). In the disclosure, the Smart Ranging Device may be a FiRa Smart Device.

"Global Dedicated File (GDF)" may be a root level of application specific data including data required to establish a USB session.

"Framework API" may be an API used by a UWB-enabled Application to communicate with the Framework.

"Initiator" may be a Ranging Device that initiates a ranging exchange. The initiator may initiate the ranging exchange by sending the first RFRAME (ranging initiation message).

"Object Identifier (OID)" may be an identifier of the ADF in the application data structure.

"Out-Of-Band (OOB)" may be data communication that does not use UWB as an underlying wireless technology.

"Ranging Data Set (RDS)" may be data (e.g., UWB session key, session Identifier (ID), etc.) required to establish a UWB session when it is needed to protect confidentiality, authenticity and integrity.

"Responder" may be a ranging device that responds to the Initiator in a ranging exchange. The responder may respond to the ranging initiation message received from the initiator.

"STS" may be a ciphered sequence for increasing the integrity and accuracy of ranging measurement timestamps. The STS may be generated from the ranging session key.

"Secure channel" may be a data channel that prevents overhearing and tampering.

"Secure Component" may be an entity (e.g., Secure Element (SE) or Trusted Execution Environment (TEE)) having a defined security level that interfaces with UWB subsystem (UWBS) for the purpose of providing RDS to UWBS, e.g., when dynamic STS is used.

"Secure element (SE)" may be a tamper-resistant secure hardware component that may be used as a Secure Component in the Ranging Device.

"Secure Ranging" may be ranging based on STS generated through a strong encryption operation.

"Secure Service" may be a software component for interfacing with a Secure Component, such as a Secure Element or Trusted Execution Environment (TEE).

"Service Applet" may be an applet on a Secure Component that handles service specific transactions.

"Service Data" may be data defined by a service provider that needs to be transferred between two ranging devices to implement a service.

"Service Provider" may be an entity that defines and provides hardware and software required to provide a specific service to an end-user.

"Static STS mode" is an operation mode in which STS is repeated during a session, and does not need to be managed by the Secure Component.

"Secure UWB Service (SUS) Applet" may be an applet on the SE that communicates with the applet to retrieve data needed to facilitate secure UWB sessions with other ranging devices. The SUS Applet may transfer corresponding data (information) to the UWBS.

"UWB Service" may be a software component that provides access to the UWBS.

"UWB Session" may be a period from when the Controller and the Controllee start communication through UWB until the communication stops. A UWB Session may include ranging, data transfer, or both ranging and data transfer.

"UWB Session ID" may be an ID (e.g., a 32-bit integer) that identifies the UWB Session, shared between the controller and the controller.

"UWB Session Key" may be a key used to protect the UWB Session. The UWB Session Key may be used to generate the STS. In this disclosure, the UWB Session Key may be a UWB Ranging Session Key (URSK), and may be abbreviated as a session key.

"UWB Subsystem (UWBS)" may be a hardware component implementing the UWB physical layer (PHY) and medium access control (MAC) specifications. UWBS may have an interface to Framework and an interface to Secure Component to search for RDS.

Time-scheduled mode (scheduled mode or Time-scheduled ranging): The time-scheduled ranging may be used for a ranging round, where the controlees are scheduled by the controller to transmit RFRAMEs/measurement reports in different ranging slots.

Contention-based mode (Contention-based ranging): The contention-based ranging may be used when the controller does not know the MAC address of the controlees that will participate in a UWB Session. The contention-based ranging allows a controller which is also the initiator to discover and range with unknown UWB devices. In such a mode, the controller may be the initiator and the controlees may be responders.

The contention-based ranging may be used for a ranging round where the controller decides and notifies the contention period size in the control message. In this mode, each responder may select one ranging slot randomly within the contention period for transmitting its ranging response message (contention-based access). In the disclosure, the contention period may be referred to as a contention access period (CAP).

Hybrid mode (hyper UWB Session (HYUS) mode): The Hybrid mode may contain ranging round(s) with interleaved contention free periods (CFPs) and CAPs. Each ranging round may contain at least one phase which performs ranging measurement. A ranging round of the hybrid mode (HYUS mode) may contain phases which can perform data transfer along with ranging measurements or only data transfer.

In certain scenarios, there may be a set of known controlees and unknown controlees. In such cases, it is beneficial for a controller to perform a ranging round in the time-scheduled mode with known controlees and in the contention-based mode with the unknown controlees. The hybrid mode (HYUS mode) allows the combination of time-scheduled ranging via CFP and Contention-based ranging via CAP in the same ranging round. When determined to make the subject matter of the disclosure unclear, the detailed description of the known art or functions may be skipped.

Hereinafter, various embodiments of the disclosure are described with reference to the accompanying drawings.

FIG. 1 illustrates an example architecture of a UWB device according to an embodiment of the disclosure.

The UWB device (electronic device) 100 of FIG. 1 may be a ranging device supporting UWB ranging (e.g., UWB secure ranging). In an embodiment, the Ranging Device may be an Enhanced Ranging Device (ERDEV) defined in IEEE 802.15.4z or a FiRa Device.

In the embodiment of FIG. 1, the UWB device 100 may interact with other UWB devices through a UWB session.

The UWB device 100 may implement a first interface (Interface #1) that is an interface between the UWB-enabled Application 110 and the Framework 120, and the first interface allows the UWB-enabled application 110 on the UWB device 100 to use the UWB capabilities of the UWB device 100 in a predetermined manner. In an embodiment, the first interface may be a Framework API or a proprietary interface, but is not limited thereto.

The UWB device 100 may implement a second interface (Interface #2) that is an interface between the Framework 120 and the UWB subsystem (UWBS) 130. In an embodiment, the second interface may be a UWB Command Interface (UCI) or proprietary interface, but is not limited thereto.

Referring to FIG. 1, the UWB device 100 may include a UWB-enabled Application 110, a Framework 120, and/or a UWBS 130 including a UWB MAC Layer and a UWB Physical Layer. Depending on the embodiment, some entities may not be included in the UWB device 100, or additional entities (e.g., security layer) may be further included.

The UWB-enabled Application 110 may trigger establishment of a UWB session by UWBS 130 through the first interface. The UWB-enabled Application 110 may use one of previously defined profiles (profile). For example, the UWB-enabled Application 110 may use one of the profiles defined in FiRa or a custom profile. The UWB-enabled Application 110 may use the first interface to handle related events, such as service discovery, ranging notifications, and/or error conditions.

The Framework 120 may provide access to Profiles, individual-UWB settings and/or notifications. The Framework 120 may be a set of software components. As described above, the UWB-enabled Application 110 may interface with the Framework 120 through the first interface, and the Framework 120 may interface with the UWBS 130 through the second interface. Software components of the Framework 120 may include, e.g., Profile Manager, OOB Connector, Secure Service, and/or UWB service.

The Profile Manager may serve to manage profiles available on the UWB device 100. Profile may be a set of parameters required to establish communication between UWB devices 100. For example, a profile may include a parameter indicating which OOB secure channel is used, a UWB/OOB configuration parameter, a parameter indicating whether the use of a particular secure component is mandatory, and/or a parameter related to the file structure of the ADF.

The OOB Connector may play a role to establish OOB connection between UWB devices. The OOB Connector may handle an OOB step including a discovery step and a connection step. The OOB step is described below with reference to FIG. 4.

The Secure Service may play a role of interfacing with a Secure Component, such as SE or TEE.

The UWB Service may perform a role of managing UWBS 130. The UWB Service may provide access to UWBS 130 from the Profile Manager by implementing the second interface.

The UWBS 130 may be a hardware component including a UWB MAC Layer and a UWB Physical Layer. The UWBS 130 may perform UWB session management and may communicate with the UWBS of another UWB device. The UWBS 130 may interface with the Framework 120 through the second interface and may obtain the RDS from the Secure Component.

Figure 2:
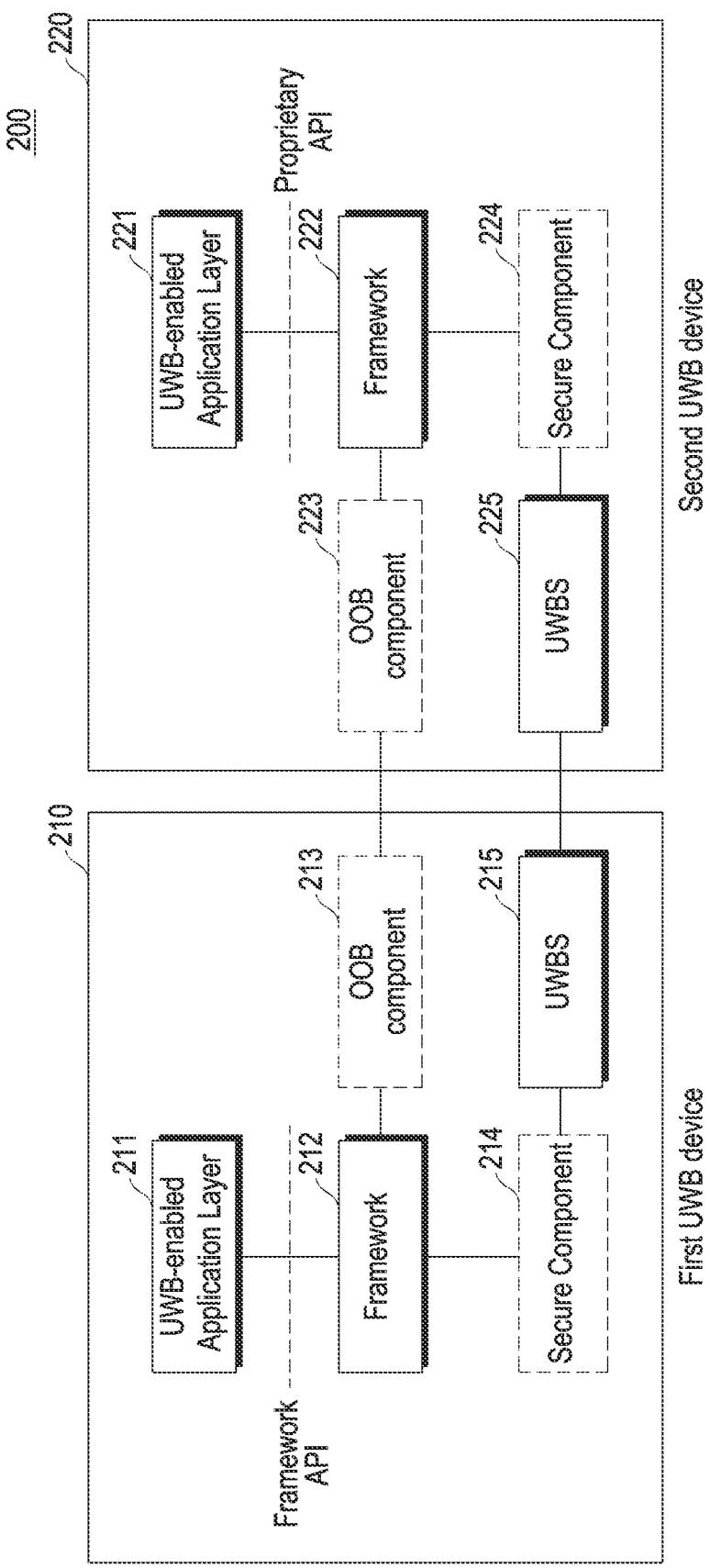
FIG. 2 illustrates an example configuration of a communication system including a UWB device according to an embodiment of the disclosure.

FIG. 2 illustrates an example configuration of a communication system including a UWB device according to an embodiment of the disclosure.

Referring to FIG. 2, the communication system 200 includes a first UWB device 210 and a second UWB device 220. In an embodiment, the first UWB device 210 and the second UWB device 220 may be, e.g., the UWB device 100 of FIG. 1 or an electronic device including the UWB device 100 of FIG. 1.

The first UWB device 210 may host, e.g., one or more UWB-enabled applications of a UWB-enabled application layer 211, which may be installed by the user (e.g., a mobile phone). It may be based on, e.g., the Framework API. The second UWB device 220 does not provide a framework API, and for example, may use a proprietary interface to implement a specific UWB-enabled application. Unlike shown, according to an embodiment, both the first UWB device 210 and the second UWB device 220 may be Ranging Devices using the Framework API, or both the first UWB device 210 and the second UWB device 220 may be Ranging Devices using the proprietary interface.

The first UWB device 210 and the second UWB device 220 may include a UWB-enabled application layer 211,221, a framework 212,222, an OOB component 213,223, a secure component 214,224, and/or a UWBS 215,225. In the disclosure, the OOB component 213,223 and/or the Secure Components 214,224 may be optional components and, according to an embodiment, may not be included in the UWB device.

The Framework 212,222 may serve to provide access to Profiles, individual-UWB settings and/or notifications. The Framework 212,222 may be a set of software components and may include, e.g., Profile Manager, OOB Connector, Secure Service, and/or UWB service. For a description of each component, refer to the above description.

The OOB components 213,223 may be hardware components including a MAC layer and/or a physical layer for OOB communication (e.g., BLE communication). The OOB components 213,223 may communicate with OOB components of other devices. In an embodiment, the first UWB device 210 and the second UWB device 220 may create an OOB connection (channel) using the OOB components and exchange parameters for establishing a UWB session through the OOB channel. In this disclosure, the OOB components 213,223 may be referred to as OOB subsystems.

The UWBS 215,225 may be a hardware component including a UWB MAC Layer and a UWB Physical Layer. The UWBS 215,225 may perform UWB session management and may communicate with the UWBS of another UWB device. In an embodiment, the first UWB device 210 and the second UWB device 220 may perform transaction of service data and UWB ranging through the UWB session established through the UWBSs using the exchanged parameters.

The Secure Components 214,224 may be hardware components that interface with the framework 212,222 and/or UWBS 215,225 to provide RDS.

In the disclosure, the UWB-enabled Application Layers and/or the Frameworks may be implemented by an application processor (AP) (or processor). Accordingly, in the disclosure, it may be understood that the operations of the UWB-enabled Application Layers and/or the Frameworks are performed by an AP (or a processor).

Figure 3A:
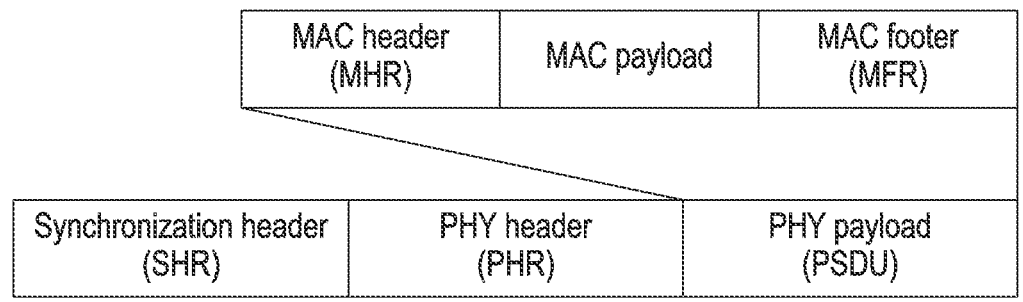
FIGS. 3A and 3B illustrate an example structure of a frame used for UWB communication according to various embodiments of the disclosure.
Figure 3B:
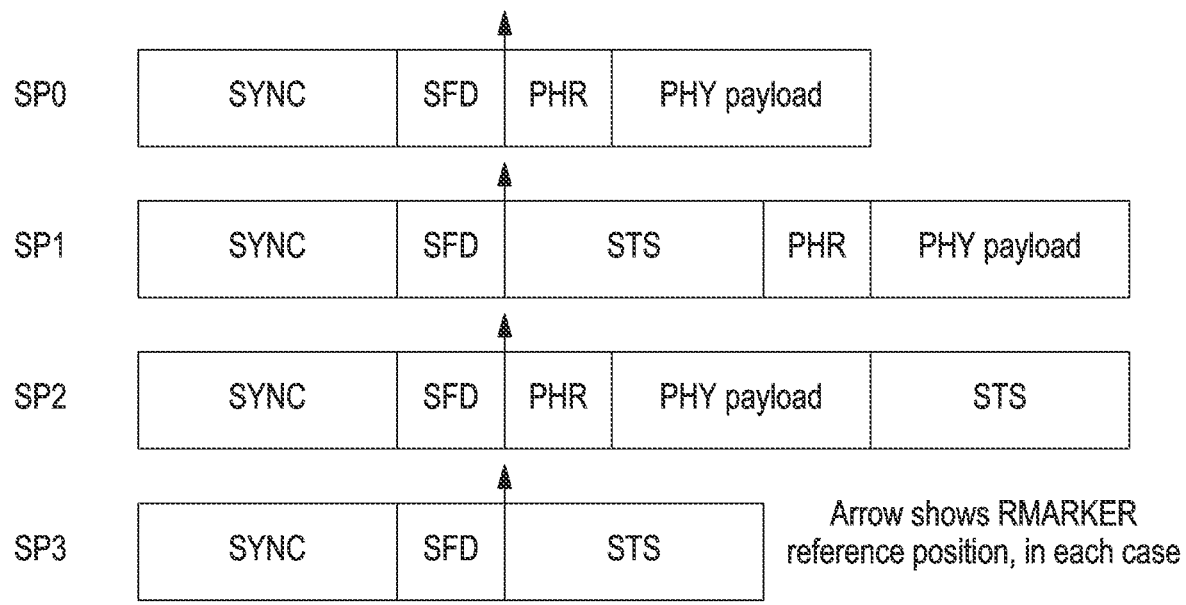

FIGS. 3A and 3B illustrate an example structure of a frame used for UWB communication according to various embodiments of the disclosure.

FIG. 3A illustrates an example structure of a frame to which the STS packet configuration is not applied, and FIG. 3B illustrates an example structure of a frame to which the STS packet configuration is applied. In an embodiment, the frame may be a ranging frame (RFRAME) for transferring ranging data (e.g., ranging initiation/reply/final message, etc.) or a data frame for transferring other data (e.g., service data, etc.).

Referring to FIG. 3A, the frame or a PHY protocol data unit (PDU) (PPDU) for transferring the frame may include a synchronization header (SHR), a PHY header (PHR), and a PHY payload (PSDU). The PSDU may include a MAC frame. The MAC frame may include a MAC header (MHR), a MAC payload and/or a MAC footer (MFR). The synchronization header of the PPDU may include a SYNC field and a start-of-frame delimiter (SFD). The SFD field may be a field indicating the end of the SHR and the start of the data field.

Meanwhile, the PHY layer of the UWB device may include an optional mode to provide a reduced on-air time for high density/low power operation. In this case, the frame may include an encrypted sequence (i.e., STS) to increase the integrity and accuracy of the ranging measurement timestamp. The STS may be used for security ranging.

The structure of the PPDU (or frame) when the STS packet setting is applied (supported) may be as shown in FIG. 3B.

Referring to FIG. 3B, in the case of STS packet (SP) setting 0 (SP0), the STS field is not included in the PPDU (SP0 packet). In the case of SP setting 1 (SP1), the STS field is positioned immediately after the Start of Frame Delimiter (SFD) field and before the PHR field (SP1 packet). In the case of SP setting 2 (SP2), the STS field is positioned after the PHY payload (SP2 packet). In the case of SP setting 3 (SP3), the STS field is positioned immediately after the SFD field, and the PPDU does not include the PHR and data field (PHY payload) (SP3 packet). In other words, in the case of SP3, the frame (or UWB message) does not include the PHR and PHY payload.

SP0, SP1 and SP3 may be settings that must be supported as mandatory when the STS packet setting is supported, and SP2 may be an optionally supported setting.

Figure 4:
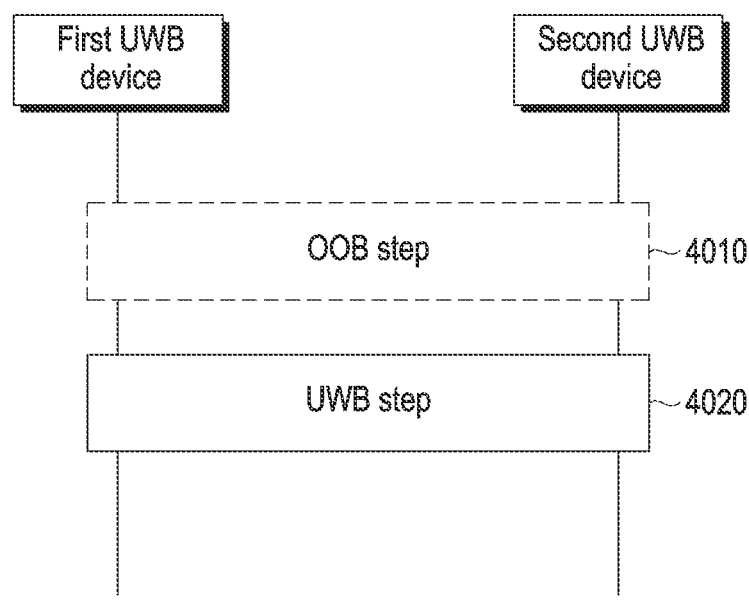
FIG. 4 illustrates a method for performing UWB communication by two UWB devices according to an embodiment of the disclosure.

FIG. 4 illustrates a method for performing UWB communication by two UWB devices according to an embodiment of the disclosure.

In the embodiment of FIG. 4, a first UWB device may play a role as a controller (or controllee), and a second UWB device may play a role as a controllee (or controller), which is the role opposite to the role of the first UWB device. The first UWB device may play a role as an initiator (or responder), and the second UWB device may play a role as a responder (or initiator), which is the role opposite to the role of the first UWB device.

(1) Referring to FIG. 4, at operation 4010, the first UWB device and the second UWB device may optionally perform an OOB step (phase) before the UWB step (phase). In this disclosure, the OOB step may be referred to as an OOB connection step.

The OOB step may be a step performed to discover UWB devices through the OOB channel (e.g., BLE channel) and to establish and control a UWB session.

In an embodiment, the OOB step may include at least one of the following steps.
  discovering UWB devices and profiles (device and profile discovery)
  establishing an OOB connection (channel)
  establishing a secure channel to secure messages and data
  exchanging parameters for establishing a UWB session through the secure channel (e.g., UWB capability parameters (controllee capability parameters), UWB configuration parameters and/or session key-related parameters) (parameter exchange step)

In an embodiment, the parameter exchange step may include the step for the controllee to transfer controllee capability parameters/messages (UWB_CAPABILITY) to the controller, the step for the controller to transfer UWB configuration parameters/messages (UWB_CONFIGURATION) to the controllee, and/or the step for one UWB device to transfer session key-related parameters/messages (SESSION_KEY_INFO) for protecting the UWB session to the other UWB device.

In an embodiment, the controllee (UWB) capability parameter and/or session key parameter may be included and transmitted in the controllee information message (CONTROLLEE_INFO) which is the OOB message transferred from the controllee to the controller. In an embodiment, the UWB configuration parameter and/or session key parameter may be included and transmitted in the session data message (SESSION_DATA) which is the OOB message transferred from the controller to the controllee.

The controllee performance parameter (UWB_CAPABILITY) may include at least one parameter that provides information about the device capability of the controllee. For example, the controller performance parameter may include a parameter for supporting the role of the device (initiator or responder), a parameter for multi-node support, a parameter for supporting STS configuration, a parameter for supporting a ranging method, a RFRAME feature performance parameter, a parameter for supporting Angle of Arrival (AoA), and/or a parameter for supporting Scheduled Mode.

The UWB configuration parameter (UWB_CONFIGURATION) may include at least one parameter used for configuration of a UWB session. For example, UWB configuration parameters may include a UWB session ID parameter, a ranging method parameter, a multi-node configuration parameter, an STS configuration parameter, a Scheduled Mode parameter, a time-of-flight (ToF) report parameter, an AoA-related parameter, a parameter indicating the number of slots per ranging round, a slot duration parameter, a responder slot index parameter, a MAC address mode parameter, a device MAC address parameter, a parameter indicating the number of controllees, and/or a destination (DST) MAC address parameter.

The session key-related parameter (SESSION_KEY_INFO) may include a session key-related parameter for Dynamic STS and/or a session key-related parameter for Static STS. For example, the session key-related parameter for Dynamic STS may include data exchanged to generate a UWB session key or data directly used as a UWB session key. For example, the Static STS may include an ID (Vendor ID) of a vendor that is a provider of the UWB-enabled application and any pre-defined value (Static STS IV) selected by the UWB-enabled application for the UWB device. The vendor ID may be used to set the phyVupper64 parameter for Static STS, and the Static STS IV may be used to set the vUpper64 parameter.

(2) At operation 4020, the first UWB device and the second UWB device may perform a UWB step. In this disclosure, the UWB step may be referred to as an UWB connection step.

The UWB step may be a step which is performed to perform UWB ranging through the UWB session and transfer service data.

In an embodiment, the UWB step may include at least one of the following steps.

Starting a UWB session (UWB Trigger)

Performing UWB ranging to obtain the distance/location between two UWB devices

Exchanging service data (transaction)

As described above, the OOB step is an optional step and may be omitted in some embodiments. For example, when discovery of a UWB device and/or establishment and control of a UWB session are performed through a UWB channel (in-band), the OOB step may be omitted. For example, when in-band discovery is performed, the OOB step of performing OOB discovery may be omitted. In this case, the UWB step may further perform an operation for discovering a UWB device through the UWB channel and exchanging parameters for UWB session configuration.

Figure 5A:
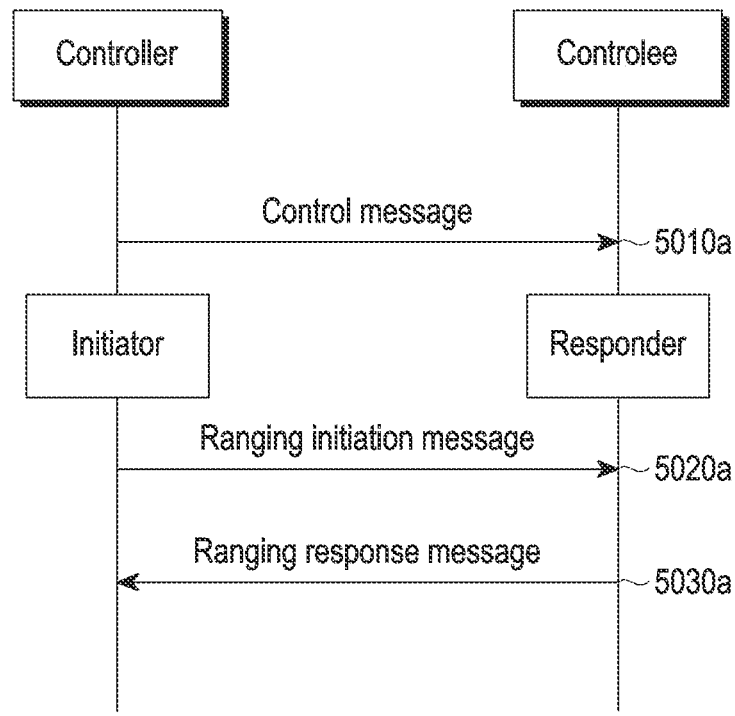
FIGS. 5A and 5B illustrate a method for performing UWB ranging by two UWB devices according to various embodiments of the disclosure.
Figure 5B:
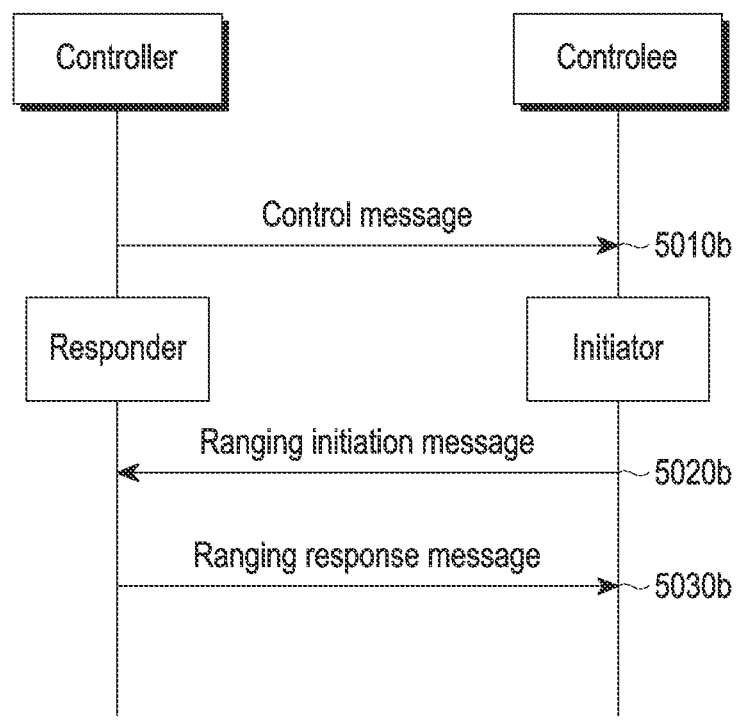

FIGS. 5A and 5B illustrate a method for performing UWB ranging by two UWB devices according to various embodiments of the disclosure.

FIG. 5A illustrates an embodiment in which the first UWB device operates as the controller/initiator, and the second UWB device operates as the controllee/responder. FIG. 5B illustrates an embodiment in which the first UWB device operates as the controller/responder, and the second UWB device operates as the controllee/initiator.

Referring to FIGS. 5A and 5B, at operations 5010*a* and 5010*b*, the controller may transmit a control message for UWB ranging to the controllee. The ranging control message may be used to carry ranging parameter(s) for controlling and configuring a ranging procedure. In an embodiment, the control message may include information about the role (e.g., initiator or responder) of the ranging device, ranging slot index information, and/or address information about the ranging device.

At operations 5020*a* and 5020*b*, the initiator may transmit a ranging Initiation message for initiating UWB ranging to the responder. In an embodiment, the initiators may transmit a ranging initiation message through an SP1 packet or an SP3 packet. When the ranging initiation message is transmitted through the SP1 packet, the control message may be included and transmitted in the PHY payload of the ranging initiation message. When the ranging initiation message is transmitted through the SP3 packet, the ranging initiation message does not include the PHR and PHY payloads.

At operations 5030*a* and 5030*b*, the responder may transmit a ranging reply message to the initiator in response to the ranging initiation message. In an embodiment, the responders may transmit a ranging reply message through an SP1 packet or an SP3 packet. When the ranging reply message is transmitted through the SP1 packet, a first measurement report message may be included and transmitted in the PHY payload of the ranging reply message. In an embodiment, the first measurement report message may include an AoA measurement, a reply time measured by the responder and/or a list of round-trip time measurements for responders and responder addresses. The reply time field may indicate a time difference between the reception time of the ranging initiation message and the transmission time of the ranging reply message at the responder side. Based on this, single-sided two-way ranging (SS-TWR) may be performed. ToF calculation through SS-TWR follows the scheme defined in IEEE 802.15.4z.

In the case of double-sided two-way ranging (DS-TWR), the initiators may further transmit a ranging final message to the responders to complete the ranging exchange. When the ranging final message is transmitted through the SP1 packet, a second measurement report message may be included and transmitted in the PHY payload of the ranging final message. In an embodiment, the second measurement report message may include an AoA measurement, the round-trip time for the first responder (first round-trip time) and/or a list of reply time measurements for responders and responder addresses. When the sender of the Measurement Report Message is the initiator, the First round-trip time field may indicate a time difference between the ranging initiation message from the initiator and the first ranging reply message from the first responder. Alternatively, when the sender of the Measurement Report Message is the responder, the First round-trip time field may indicate a time difference between the ranging reply message from the responder and the ranging final message from the initiator. Based on this, DS-TWR may be performed. Time-of-flight (ToF) calculation through DS-TWR follows the scheme defined in IEEE 802.15.4z.

According to an embodiment, the above-described first measurement report message and/or second measurement report message may not be included in the ranging reply message and/or the ranging final message but may be transmitted as separate messages. For example, the measurement report message may be transmitted through the data frame after the ranging exchange.

Meanwhile, the initiator and responder may perform UWB ranging according to a preset Schedule Mode. For example, in the time-scheduled ranging mode, the controller may know the IDs of all controllees and may designate an accurate schedule of ranging transmission. As another example, in the contention-based ranging mode, the controller does not know the number and ID of the controllees, and thus UWB devices compete with each other. In this case, a collision may occur between the responding devices.

Figure 6:
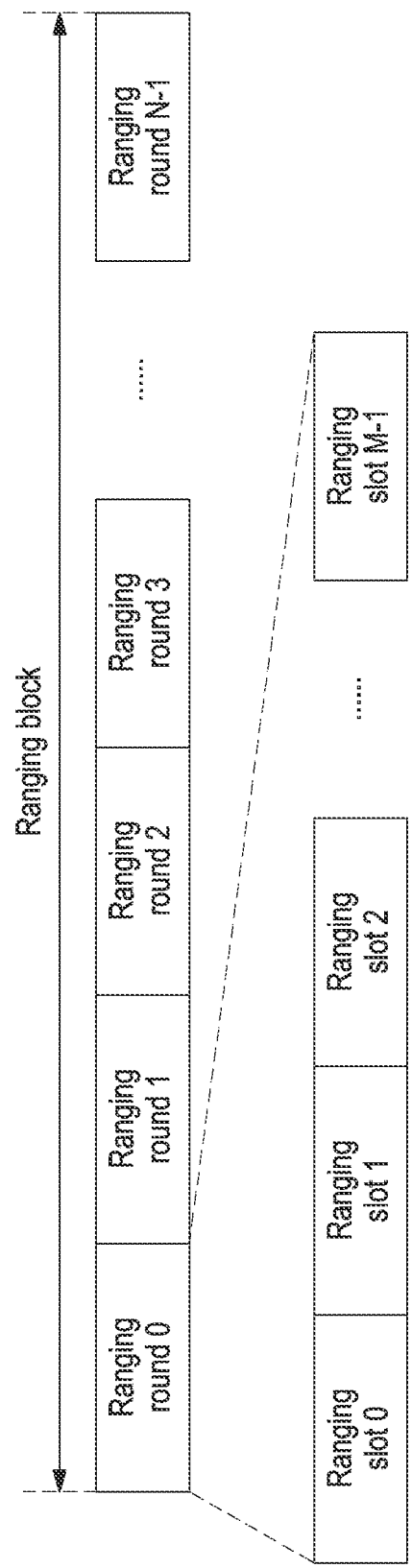
FIG. 6 illustrates a structure of a ranging block and a round used for UWB ranging according to an embodiment of the disclosure.

FIG. 6 illustrates a structure of a ranging block and a round used for UWB ranging according to an embodiment of the disclosure.

In this disclosure, the ranging block refers to a time period for ranging. The ranging round may be a period of sufficient duration to complete one entire range-measurement cycle in which a set of UWB devices participating in a ranging exchange involves. The ranging slot may be a sufficient period for transmission of at least one ranging frame (RFRAME) (e.g., ranging initiation/reply/final message, etc.).

Referring to FIG. 6, one ranging block may include at least one ranging round. Each ranging round may include at least one ranging slot.

When the ranging mode is a block-based mode, a mean time between contiguous ranging rounds may be a constant. Alternatively, when the ranging mode is an interval-based mode, the time between contiguous ranging rounds may be dynamically changed. In other words, the interval-based mode may adopt a time structure having an adaptive spacing.

The number and duration of slots included in the ranging round may be changed between ranging rounds. This may be configured through a control message from the controller.

A ranging round may be concisely referred to as a round, a ranging block may be concisely referred to as a block, and a ranging slot may be concisely referred to as a slot.

The UWB protocol is applicable to a use case for handling multiple users and providing fast authentication or payment. For example, the UWB protocol is applicable to a gate service in which users having a UWB device (e.g., smartphone) may process authentication or payment without interaction on the UWB device to pass a UWB-based gate system.

The disclosure proposes an example system architecture, example OOB procedure (e.g., BLE procedure), ranging procedure, and transaction procedure for providing a UWB service for multiple users, e.g., the gate system.

The disclosure also proposes a ranging block structure, a message format, a message flow, and a MAC protocol for supporting multiple access by multiple unspecified users, that is, contention-based multiple access.

The following description of embodiments focuses primarily on the gate service (smart gate service). However, this is merely an example. Embodiments of the disclosure are also applicable to various types of services (e.g., point of sale (PoS) payment service) requiring fast authentication or payment processing for multiple users. In this case, what has been described above in connection with FIGS. 1, 2, 3A, 3B, 4, 5A, 5B, and 6 may be referenced for the example system architecture, example OOB procedure (e.g., BLE procedure), ranging procedure, and transaction procedure for providing the service.

Figure 7:
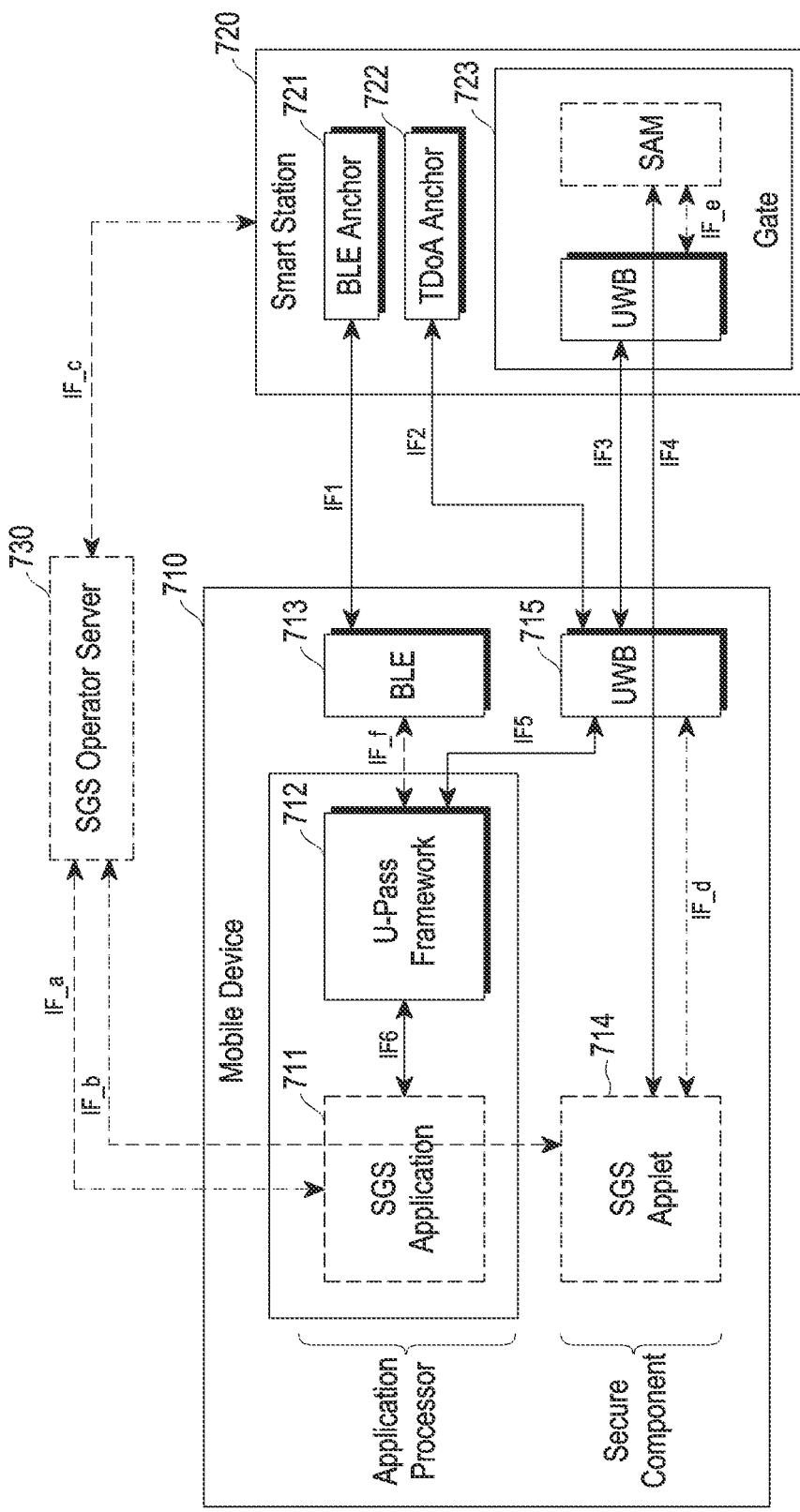
FIG. 7 illustrates an example architecture of a system of providing a UWB-based gate service according to an embodiment of the disclosure.

FIG. 7 illustrates an example architecture of a system of providing a UWB-based gate service according to an embodiment of the disclosure.

In the disclosure, the UWB-based gate service may be referred to as a gate service or a smart gate service (SGS), and the system that provides a UWB-based gate service may be referred to as a gate system or a smart gate system.

Referring to FIG. 7, the gate system may include a mobile device 710, a smart station 720 and/or an SGS operator server 730. In this disclosure, the mobile device 710 may be referred to as a first UWB device, and the smart station 720 may be referred to as a second UWB device.

(1) The mobile device 710 may include an SGS application 711, a framework (U-Pass framework) 712, a BLE component (subsystem) 713, an SGS applet 714, and/or a UWB component (subsystem) 715. In an embodiment, the framework, the SGS application 711, the SGS applet 714, the BLE component 713, and/or the UWB component 715 of the mobile device may be examples of the framework, UWB-enabled application, applet, OOB component, and UWB component, respectively, of the UWB device described above in connection with, e.g., FIG. 1.

The framework 712 may support at least one of the following functions.
  Estimate the location of the mobile device during the Downlink-TDoA (D-TDoA) round
  Implement procedures for performing UWB ranging and transaction
    Provide a set of APIs for the SGS operator's application (SGS application) and provide an interface between the framework and UWB components.
  Trigger UWB communication (component) when BLE advertisement is received from smart station.

The SGS application 711 may support at least one of the following functions.
  When requested by the framework, provide anchor and UWB block structure deployment information
  Provide the framework with the AID of SGS applets and the version of the SGS applet protocol
  Communication with the SGS operator server to initiate service application installation, station specific information retrieval (e.g., anchor map), and token retrieval or renewal process The SGS applet 714 may support at least one of the following functions.
  Hosted on a secure component (e.g., SE or TEE) capable of communicating through a UWB interface.
  Implement transaction protocol for gate service
  Support APDU command The BLE component 713 may be used to receive at least one BLE message from the smart station when the mobile device enters the service area of the gate system.

The UWB component 715 may be used to estimate the location of the mobile device, e.g., by D-TDoA, and/or may be used to communicate with a specific gate to perform UWB ranging and transactions.

(2) The smart station 720 may include at least one BLE anchor, at least one TDoA anchor, and/or at least one gate (gate device).

The BLE anchor 721 may be used to provide general station information about the mobile device and to inform that the mobile devices are entering the service area of the gate system.

In an embodiment, the BLE anchor may support a role as a GAP broadcaster, a role as a GATT server, and/or broadcasting of the advertising physical channel PDU.

The TDoA anchor 722 may be deployed in the service area of the gate system.

As an embodiment, the gate system may deploy a required number of TDoA anchors 722 in the service area (e.g., walls, ceilings, or structures within the station) to provide the gate service.

As an embodiment, the TDoA anchor 722 may perform an operation for Downlink TDoA localization and/or an operation for Uplink TDoA localization based on UWB. When the TDoA anchor 722 performs the operation for Uplink TDoA localization, the gate system may identify the location of the mobile device through Uplink TDoA localization (one way ranging (OWR)) between the mobile device and TDoA anchors 722, as well as identify the location of the mobile device through DS-TWR between the mobile device and the gate device. In the disclosure, the OWR denotes a scheme in which ranging is performed through a ranging message transferred in one direction, unlike TWR (e.g., SS-TWR or DS-TWR) in which ranging is performed through exchange of ranging messages between two UWB devices. The OWR may be used for TDoA localization.

In the disclosure, the Uplink TDoA localization method is a method in which TDoA anchors 722 (UWB anchors) receive the UWB message (ranging message) from the mobile device (UWB tag), calculate the time difference (TDoA) and, based thereupon, determine the location of the mobile device and corresponds to one of OWR schemes. The Downlink TDoA localization method is a method in which the mobile device (UWB tag) receives the UWB messages (ranging messages) from the TDoA anchors 722 (UWB anchors), calculate the time difference (TDoA) and, based thereupon, determine the location of the mobile device and corresponds to one of the OWR schemes. In the disclosure, the TDoA anchor 722 performing Uplink TDoA localization may be referred to as an UL-TDoA anchor or U-TDoA anchor, and the TDoA anchor 722 performing Downlink TDoA localization may be referred to as a DL-TDoA anchor or D-TDoA anchor.

In an embodiment, at least one TDoA anchor 722 of the gate system may serve as both a U-TDoA anchor and a D-TDoA anchor. In this case, at least one TDoA anchor 722 may operate as a D-TDoA anchor in a first section (e.g., a section of the ranging round allocated for Downlink TDoA localization) and operate as a U-TDoA anchor in a second section (e.g., a section of the ranging round allocated for ranging/transaction with the gate device and the mobile device).

In another embodiment, the gate system may separately include TDoA anchors 722 serving as U-TDoA anchors and TDoA anchors serving as D-TDoA anchors.

As an embodiment, the plurality of U-TDoA anchors may receive the message transmitted or broadcast from the mobile device. Thus, a difference (TDoA) between message arrival times for a pair of U-TDoA anchors may be calculated, and the location of the user device may be estimated based on the TDoA results of several pairs. As an embodiment, the plurality of U-TDoA anchors may be synchronized according to a preset synchronization scheme.

The D-TDoA anchor may broadcast a UWB message at a specific time. This UWB message may be used by the mobile device to estimate its location. As an embodiment, the mobile device may receive or overhear the messages transmitted or broadcast by a plurality of D-TDoA anchors. Thus, a difference (TDoA) between message arrival times for a pair of D-TDoA anchors may be calculated, and the location of the user device may be estimated based on the TDoA results of several pairs. As an embodiment, the plurality of D-TDoA anchors may be synchronized according to a preset synchronization scheme.

The gate device may include at least one UWB component (sub-system) and/or a security authentication module. The UWB component may be an example of the UWB subsystem described above in connection with FIG. 1 and the like. In an embodiment, the gate arrangement may include at least one anchor, and each anchor may include at least one UWB component.

The UWB component may be used to communicate with the mobile device for gate access and gate ranging, so as to identify whether the mobile device is within a valid range to perform the transaction procedure and pass through the gate.

In an embodiment, the UWB component may support at least one of the following features.

Perform DS-TWR

Perform gate connection and gate ranging

Provide an interface to the security authentication module

The security authentication module may be used to verify whether the mobile device is authenticated to use the gate system.

In an embodiment, the security authentication module may support at least one of the following features.

Provides an interface to the UWB component

Capability of communication through UWB interface

Capability for synchronization with the SGS operator server (3) The SGS operator server 723 may manage the entire gate system. To this end, the SGS operator server 723 may communicate with the mobile device and smart station.

Figure 8:
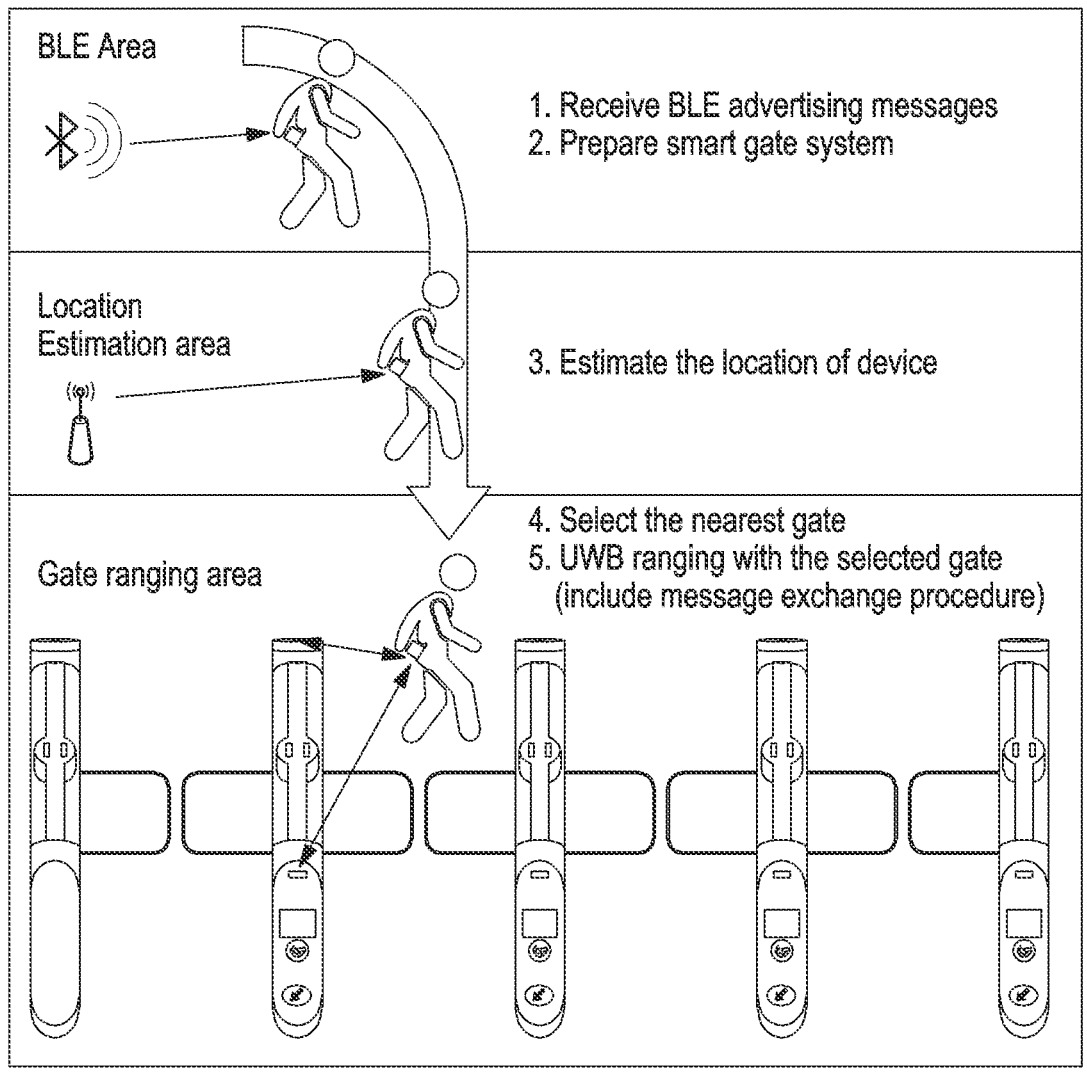
FIG. 8 illustrates an example operation scenario of a gate system according to an embodiment of the disclosure.

FIG. 8 illustrates an example operation scenario of a gate system according to an embodiment of the disclosure.

The gate system of FIG. 8 may be the gate system of FIG. 7.

Referring to FIG. 8, at operation 1, when the mobile device (or the user carrying the mobile device) enters the BLE area of the gate system, the mobile device may receive a BLE advertisement message (packet) from at least one BLE anchor of the smart station. The at least one BLE anchor may be positioned in the BLE area.

At operation 2, upon receiving the BLE advertisement message, a prerequisite procedure for the gate system may be performed. In other words, the gate system may be prepared. In an embodiment, the prerequisite procedure may be activated by the UWB component of the mobile device and be used to obtain authentication-related information and/or UWB-related information from the SGS operator server.

At operation 3, when the mobile device enters a location estimation area, the mobile device may estimate its location to determine the nearest gate which it is to pass. In an embodiment, the mobile device may receive a TDoA message from at least one TDoA anchor of the smart station and estimate its location using a D-TDoA scheme. The application (SGS application) of the mobile device may provide or use the locations of gate(s).

At operation 4, the mobile device may select the nearest gate. In an embodiment, the mobile device may select the nearest gate based on the result of estimation of the location of the mobile device and the location of the gate(s).

At operation 5, the mobile device may perform a procedure for UWB ranging with the selected gate. After selecting the nearest gate, the mobile device may participate in contention in a specific slot to perform UWB ranging with the gate. Slots (contention period) possible for participating in contention may be known through a UWB message by the gate. If the mobile device obtains a chance for transmittance, UWB ranging and service protocol (transaction) may be performed with the gate. After proper authentication or payment capability is verified through exchange of messages and UWB ranging, the user may pass the gate.

Figure 9:
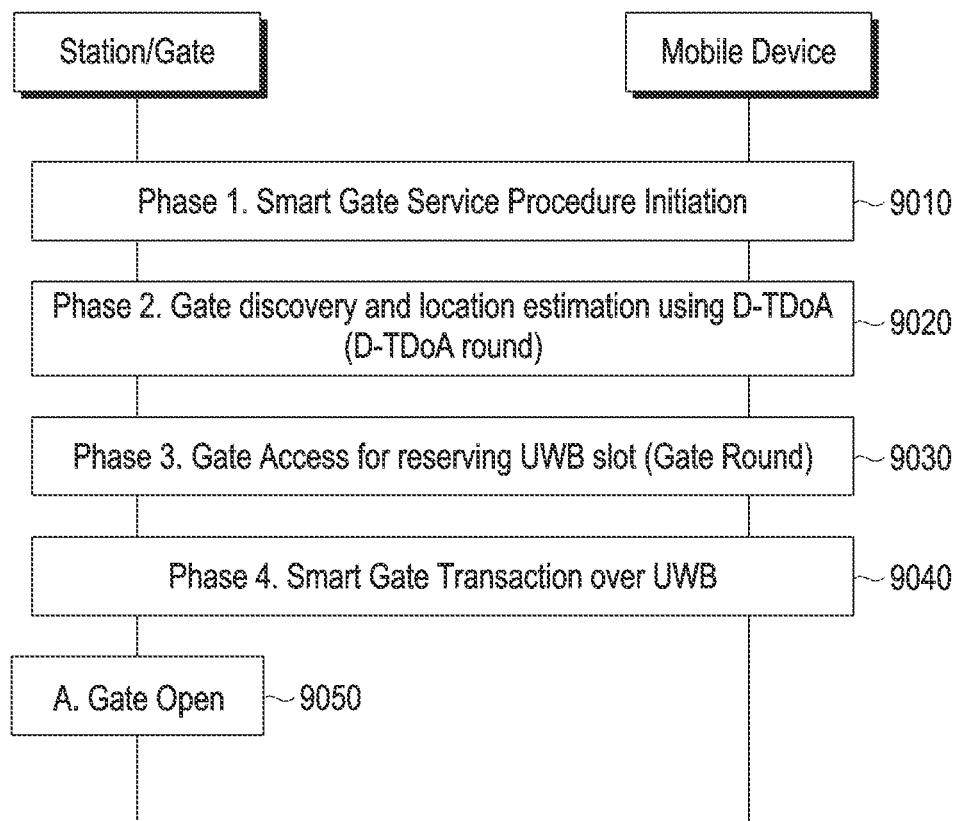
FIG. 9 illustrates a smart gate service procedure of a gate system according to an embodiment of the disclosure.

FIG. 9 illustrates a smart gate service procedure of a gate system according to an embodiment of the disclosure.

The gate system of FIG. 9 may be the gate system of FIG. 7.

Referring to FIG. 9, a smart gate service procedure may be performed between a smart station including at least one gate device and at least one mobile device.

The smart gate service procedure may include a smart gate service initiation phase (phase 1) 9010, a gate discovery and location estimation phase using D-TDoA (phase 2) 9020, a gate access phase for UWB slot reservation (phase 3) 9030, and/or a transaction phase through UWB (phase 4) 9040. If the transaction (transaction phase) according to the smart gate service procedure is complete, a specific gate may be open 9050. Thus, the user may enter or exit the specific gate.

In an embodiment, the smart gate service initiation phase 9010 may include, e.g., operations 1 and 2 of FIG. 8.

In an embodiment, the gate discovery and location estimation phase 9020 may include, e.g., operation 3 of FIG. 8.

In an embodiment, the gate access phase for UWB slot reservation 9030 may include, e.g., the access operation (participation in contention) of operations 4 and 5 of FIG. 8. During the gate access phase for UWB slot reservation 9030, the mobile device may participate in contention to occupy a slot for data communication. If the mobile device obtains a specific slot, the gate and the mobile device may exchange data for the service protocol.

In an embodiment, the transaction phase through UWB 9040 may include, e.g., the UWB ranging and service protocol (transaction) operation of operation 5 of FIG. 8. In an embodiment, the service protocol may need a plurality of, e.g., ranging blocks to complete the message exchange procedure. For example, to complete the message exchange procedure for each gate, a plurality of ranging rounds may be needed and, since one round for the corresponding gate may be allocated to one block, the service protocol may require a plurality of blocks to complete the message exchange procedure.

Figure 10:
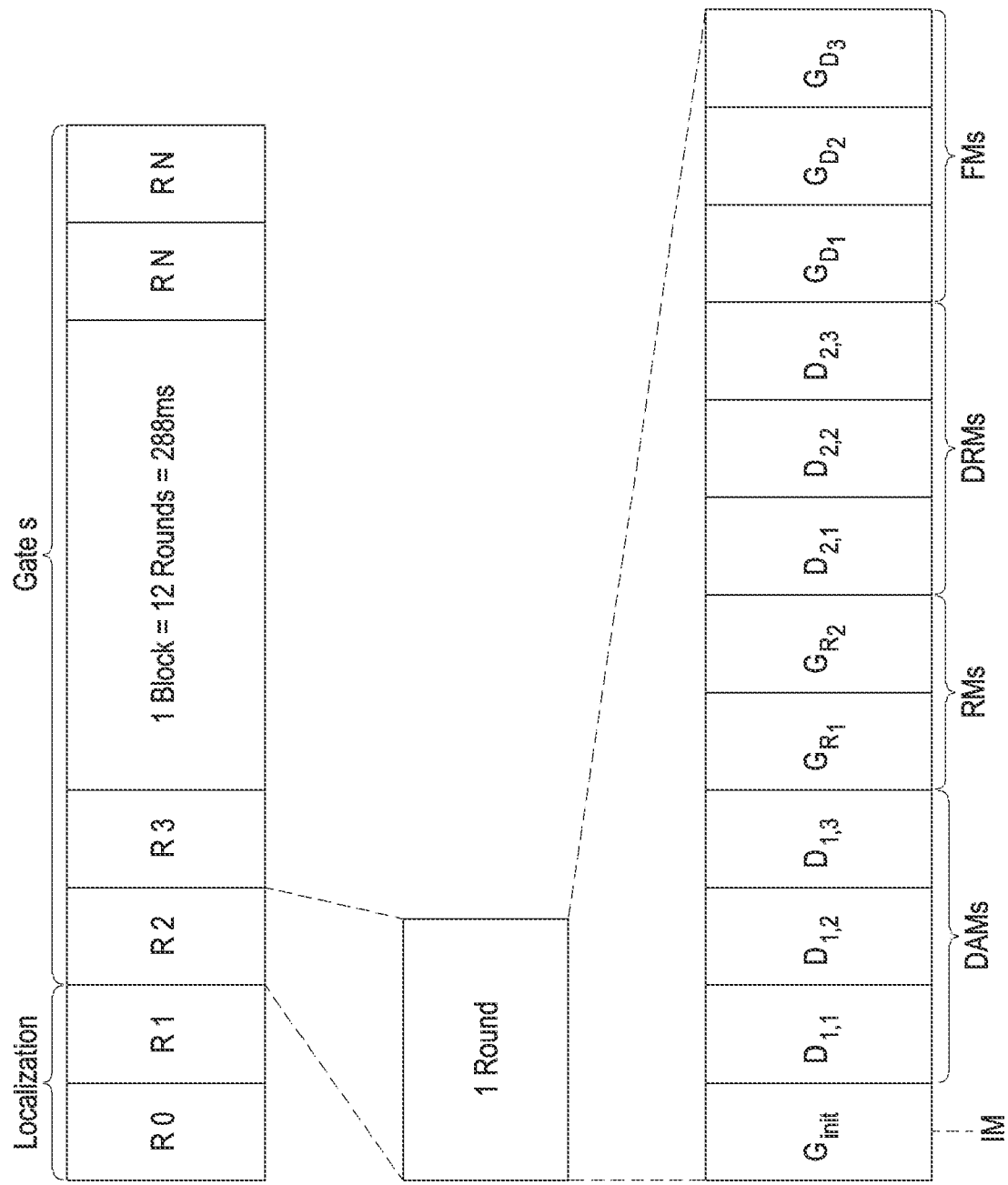
FIG. 10 illustrates a structure of a ranging block used for a smart gate service according to an embodiment of the disclosure.

FIG. 10 illustrates a structure of a ranging block used for a smart gate service according to an embodiment of the disclosure.

The ranging block of FIG. 10 may be an example of the ranging block of FIG. 6.

Referring to FIG. 10, the ranging block includes a plurality of ranging rounds. In an embodiment, the ranging block may include at least one ranging round for location estimation (localization) and at least one ranging round for at least one gate. In the disclosure, the round for location estimation may be referred to as a D-TDoA round, and the round for the gate (round for communication with the gate) may be referred to as a gate round.

As an embodiment, the TDoA anchor (e.g., the TDoA anchor of the smart station of FIG. 7) may operate as a D-TDoA anchor for DL-TDoA localization in the D-TDoA round. In this case, the TDoA anchor may transmit or broadcast a message for DL-TDoA localization, and the mobile device (e.g., the mobile device of FIG. 7) may receive the message and determine its location.

As an embodiment, the TDoA anchor (e.g., the TDoA anchor of the smart station of FIG. 7) may operate as a U-TDoA anchor for UL-TDoA localization in the gate round. In this case, the mobile device (e.g., the mobile device of FIG. 7) may transmit or broadcast a message for UL-TDoA localization, and the TDoA anchor may receive the message and determine the location of the mobile device. With this scheme, if the TDoA anchor operates as a U-TDoA anchor in the gate round, the gate system will be able to identify the location of the mobile device.

As an embodiment, a device access message (DAM) transmitted in the gate round may be used as a message for UL-TDoA localization. As an embodiment, the DAM may be transmitted in a DAM period, and the DAM period may include, e.g., a number of ranging slots corresponding to a maximum number (e.g., n) of mobile devices allowed in a corresponding round.

In a state where the mobile device is not coordinated or scheduled correctly, when the gate system uses UL-TDoA localization using UWB to identify the location of the mobile device around the gate (gate device), a collision of messages may affect other communications between the gate and the mobile device. However, if Uplink TDoA localization is performed in the DAM period, using the DAM of the disclosure, a collision is less likely, so that such issues may be addressed.

The message structure of the DAM for UL-TDoA localization and the UL-TDoA localization operation using the same are described below with reference to FIGS. 14B and 14C.

In an embodiment, one gate round may be allocated for each gate. For example, as illustrated, when the smart station includes 12 gates, the ranging block may include 12 gate rounds. In an embodiment, the gate may transmit an initiation message to initiate its gate round. In the gate round, the gate and the mobile device may process a gate access procedure (phase) and a gate ranging procedure (phase).

In an embodiment, the gate round includes a plurality of ranging slots. As many ranging slots as needed for multiple access to the corresponding gate, UWB ranging, and/or transaction may be allocated, and the number of slots may be nearly fixed. For example, as illustrated, there may be allocated as many slots as needed for the period for the initiation message IM, the period for the device access message DAM corresponding to the initiation message, the period for the reply message RM corresponding to the device access message, the period for the device reply message DRM corresponding to the reply message, and/or the period for the final message FM.

In an embodiment, IM, RM, and FM may be messages transmitted by a smart station or a gate device of a smart station, and DAM and DRM may be messages transmitted by a mobile device.

Figure 11:
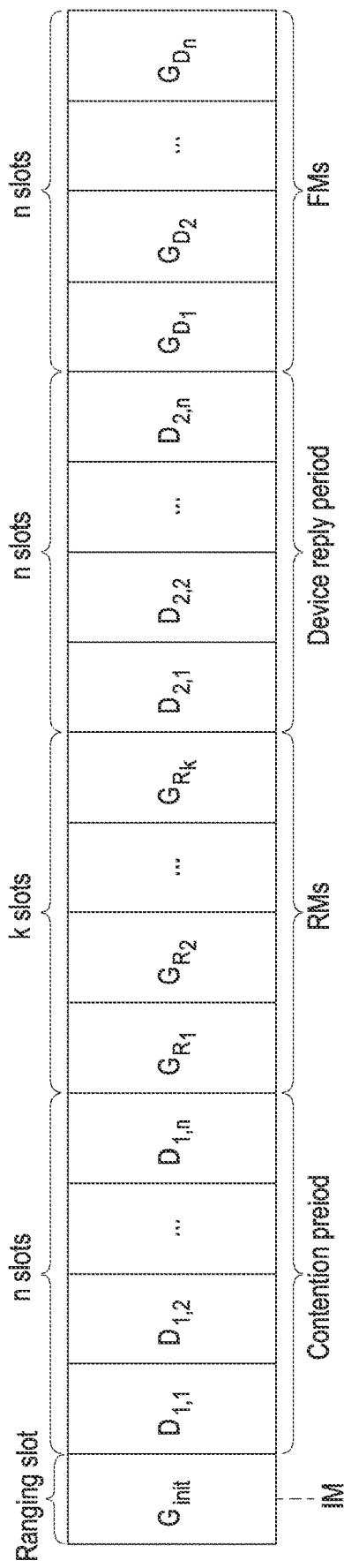
FIG. 11 illustrates a structure of a ranging round according to an embodiment of the disclosure.

FIG. 11 illustrates a structure of a ranging round according to an embodiment of the disclosure.

FIG. 11 may be an example of the structure of the gate round belonging to the ranging block of FIG. 10.

As described above with reference to FIG. 6, one ranging round may include at least one ranging slot. In this case, the number of ranging slots included in the ranging round may vary depending on the environment or settings applied.

The embodiment of FIG. 11 relates to a ranging round structure for supporting contention-based multiple access (or, hybrid multiple access). The ranging round structure of FIG. 11 may be a structure that facilitates the initiator, as well as the responder, to perform DS-TWR. In the embodiment of FIG. 11, the initiator may be a gate device (or PoS device), and the responder may be a mobile device.

Referring to FIG. 11, the ranging round may include an IM phase/period in which the gate device transmits an initiation message (IM) to the mobile device(s), a DAM phase/period in which the mobile device(s) transmits a device access message (DAM) to the gate device in the contention period, an RM phase/period in which the gate device transmits a reply message (RM) (or gate reply message (GRM)) to the mobile device(s), a DRM phase/period in which the mobile device(s) transmits a device reply message (DRM) for the RM of the gate device to the gate device, and an FM phase/period in which the gate device transmits a final message (FM) to the mobile device(s). In an embodiment, the final message may be used to transfer service data (e.g., data for payment). Further, the DAM and/or DRM may also be used to transfer service data as needed.

In this disclosure, the IM phase may be referred to as an initiation phase or a ranging initiation phase. The DAM phase may be referred to as a contention phase or a contention window phase. The RM phase may be referred to as a GRM phase, an initiator reply phase, or a PoS reply phase. The DRM phase may be referred to as a responder reply phase.

In this disclosure, a period of the IM phase may be referred to as a first period. A period of the DAM phase may be referred to as a second period or a contention period. A period of the RM phase may be referred to as a third period. A period of the GRM phase may be referred to as a fourth period. A period of the FM phase may be referred to as a fifth period.

In the embodiment of FIG. 11, the IM phase may include one ranging slot. For example, as shown in FIG. 11, the IM phase may include the first ranging slot of the corresponding ranging round.

The DAM phase may include, e.g., a number of ranging slots corresponding to the maximum number (e.g., n) of mobile devices allowed in the corresponding round. For example, to support access by up to n mobile devices in the corresponding round, the number of slots in the DAM phase should be set to n. In an embodiment, the maximum number of allowed mobile devices (e.g., n) may be equal to or smaller than the number of candidate mobile device to participate in the contention or ranging procedure. In an embodiment, the number of candidate mobile devices may be identified through, e.g., an OOB procedure or D-TDoA procedure performed prior to a ranging procedure. As shown in FIG. 11, ranging slot(s) of the DAM phase may start immediately after the ranging slot of the IM phase.

The RM phase may include a number of ranging slots corresponding to the number (e.g., k) of anchors of the gate device. Like the DAM phase, the DRM phase and the FM phase may include a number of ranging slots corresponding to the number (e.g., n) of mobile devices. In other words, the number of ranging slots in the DAM phase, the number of ranging slots in the DRM phase, and the number of ranging slots in the FM phase may be the same. The total number of ranging slots configured in such a manner may be 3n+k+1.

However, without limited thereto, according to an embodiment, the number of ranging slots in some phases or all phases may be adjusted as needed. For example, the IM phase may include a number of slots corresponding to the number (e.g., k) of anchors of the gate device. In this case, each anchor may transmit an initiation message in each slot of the IM phase. For example, the DAM phase, the DRM phase, and/or the FM phase may include a greater number of ranging slots than the number of candidate mobile devices.

In the embodiment of FIG. 11, the number of slots in the contention phase (DAM phase) and the number of slots in the DRM phase/number of slots in the FM phase are the same. Meanwhile, according to an embodiment, a restriction may be imposed so that only mobile devices which have succeeded in contention (or access) transmit a DRM in the DRM phase and, in such a case, the number of slots in the DRM phase and the number of slots in the FM phase may be smaller than the number of slots in the DAM phase.

To provide a service for multiple specified users, like the above-described gate service, one gate device (or PoS device) may need processing of UWB ranging and transaction based on DS-TWR with the mobile devices of the multiple unspecified users. In this case, when the gate device operates as an initiator, the gate device is unable to identify information about the mobile devices around and thus may not specify the mobile devices for DS-TWR. Accordingly, the gate device has difficulty in performing multiple access (coordinated access/time-scheduled access) to unspecified mobile devices based on scheduling of the gate device every block (round) and may perform multiple access (random access/contention-based access) based on random contention of the mobile devices.

One gate device needs to perform exchange of several messages with the mobile device, which consumes a long time, to complete a specific service protocol (transaction) (e.g., a transaction requiring secure processing). In this case, if one block is used only for one gate, the message exchange procedure may be done in the block. However, if one block is shared by a plurality of gates as in the embodiment of FIGS. 10 and 11, the message exchange procedure between a corresponding gate and the mobile device requires several blocks. In this case, if random access-based multiple access alone is performed, the number of blocks required to complete the message exchange procedure is further increased. This renders it difficult to provide the service.

Accordingly, the disclosure proposes a novel multiple access (hybrid access) scheme in which when a mobile device obtains a chance for communicating with a corresponding gate through random access in some section of a block (round), the mobile device is able to continuously communicate with the gate through coordinated access without random access until the message exchange is complete and a UWB message structure for the scheme.

Figure 12:
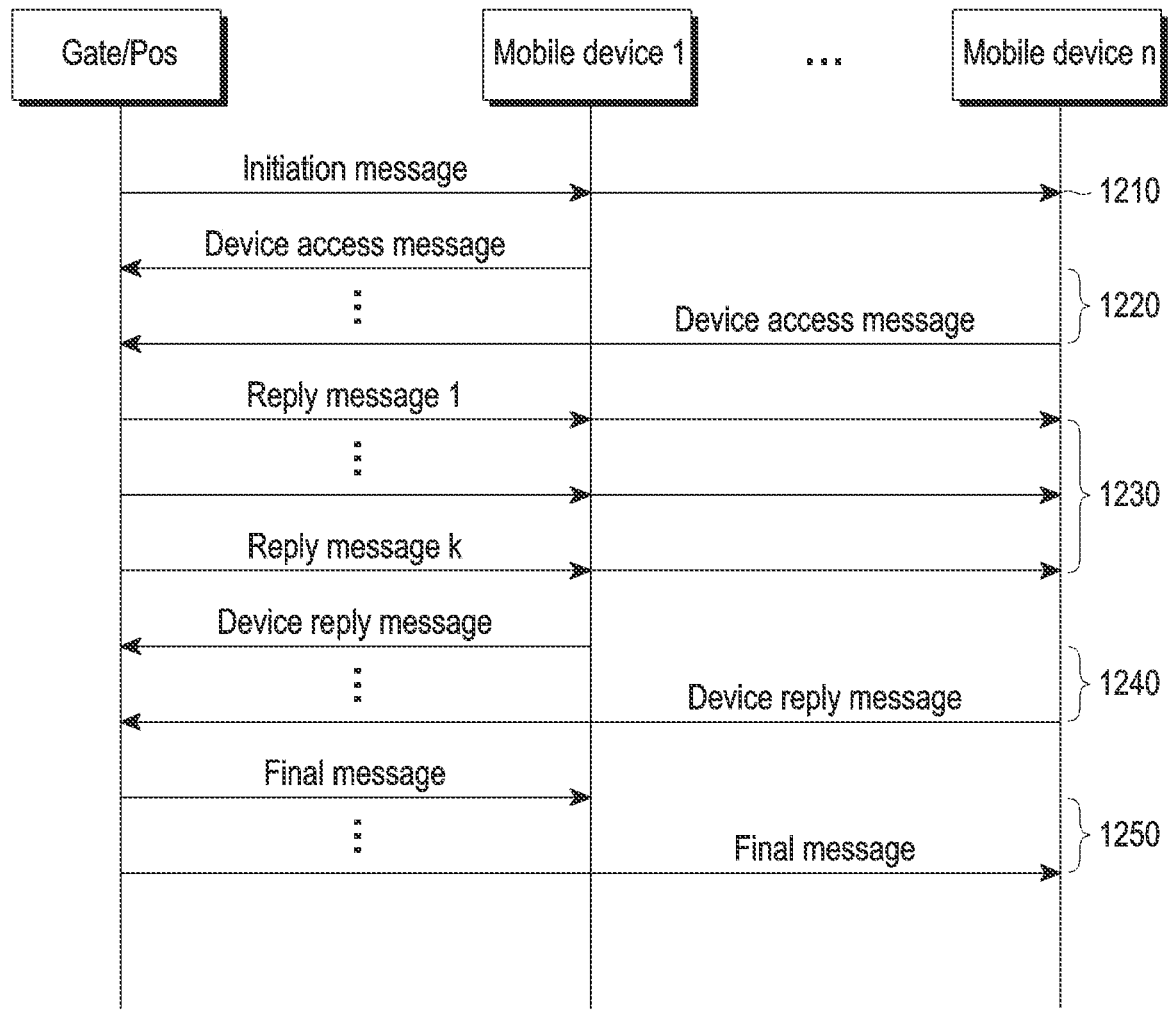
FIG. 12 illustrates a ranging procedure according to an embodiment of the disclosure.

FIG. 12 illustrates a ranging procedure according to an embodiment of the disclosure.

The ranging procedure of the embodiment of FIG. 12 may be, e.g., a ranging procedure (1:N ranging) between one initiator and n responders. In the embodiment of FIG. 12, each responder may participate in the ranging procedure through the above-described contention-based multiple access (random access).

In an embodiment, the initiator may be a gate device or PoS device, and the responder may be the user's mobile device. In the embodiment of FIG. 12, the initiator may be referred to as a Gate/PoS device or a first UWB device, and the responder may be referred to as a mobile device or a second UWB device.

The structure of the ranging round used in the embodiment of FIG. 12 may be, e.g., the ranging round structure of FIG. 11.

Meanwhile, the Gate/PoS device of the embodiment of FIG. 12 may include k anchors (UWB anchors (e.g., TDoA anchor)), e.g., to identify the distance, direction and/or location of the mobile device. In this case, one anchor may be a main anchor transmitting the IM, first RM, and FM, and the remaining anchors may be sub anchors transmitting their own RMs instead of the first RM. In the disclosure, the operation for each anchor may be referred to as the operation for the Gate/PoS device.

Referring to FIG. 12, at operation 1210, the Gate/PoS device may transmit an IM to the mobile device(s). For example, the Gate/PoS device or the main anchor of the Gate/PoS device may broadcast the IM in the slot of the IM phase. The Gate/PoS device may initiate its own ranging round by transmitting this IM. In an embodiment, the IM may provide information about the slot(s) of the DAM phase. For example, the IM may provide state information (e.g., occupied or empty) on the slots for the DAM. Thus, the above-described hybrid access may be possible. An example of such an IM is described below with reference to FIGS. 13A to 13C.

At operation 1220, the mobile device(s) may transmit the DAM in the slot(s) of the DAM phase based on the information included in the IM. In an embodiment, the mobile device(s) receiving the IM may transmit the DAM to the Gate/PoS device when a specific condition is met. For example, the mobile device(s) may transmit the DAM to the Gate/PoS device when the distance from the Gate/PoS device, obtained based on the location estimation, is within a preset threshold.

In an embodiment, when 1) the mobile device participates in contention in the previous ranging block to obtain a ranging slot, 2) the Gate/PoS device and the mobile device are determined to be located within a specific distance as a result of DS-TWR performed between the Gate/PoS device and the mobile device after the contention of the previous ranging block, and 3) it is determined that a message set to be additionally exchanged remains in the message exchange protocol (e.g., payment) (the corresponding service protocol is determined not to be complete), the mobile device may continue message exchange without contention. In other words, when the foregoing three conditions are met, the corresponding slot is reserved for a specific mobile device and, in the occupied slot, other mobile devices may not transmit a DAM. The occupied slot may be, e.g., a slot that has been selected (reserved) by the Gate/PoS device in the previous block or a service protocol has not yet been completed.

In an embodiment, the mobile device may participate in contention in an empty slot. The empty slot may be, e.g., a slot that has not been selected (reserved) by the Gate/PoS device in the previous block or a service protocol has been completed.

An example of such a DAM is described below with reference to FIG. 14A or 14B.

At operation 1230, the Gate/PoS device or each anchor of the Gate/PoS device may transmit an RM in response to the DAM. For example, the main anchor of the Gate/PoS device may broadcast the first RM in, e.g., the first slot of the RM phase, and the remaining sub anchor(s) may broadcast their first RMs according to a predetermined order in the remaining slots of the RM phase. The transmission order of the RMs by the sub anchors may be determined by the Gate/PoS device.

In an embodiment, the RM may include information about the result of contention in the DAM phase. In an embodiment, the RM may include ranging report information/message for DS-TWR. In an embodiment, the ranging report information may include a First Round trip Time field and/or a Reply Time List field used to perform DS-TWR. In an embodiment, the mobile device may perform DS-TWR based on the IM, DAM and RM to identify the distance to the Gate/PoS device.

An example of such an RM is described below with reference to FIGS. 15A and 15B.

At operation 1240, the mobile device(s) may transmit the DRM to the Gate/PoS device in response to the RM. For example, based on the information included in the RM and the result of UWB ranging based on DS-TWR, the mobile device may transmit the DRM to the Gate/PoS device in the corresponding slot of the DRM phase.

In an embodiment, the DRM may include information (identification information) for identifying the mobile device. In an embodiment, the identification information is information used only in a specific session and may be changed whenever the service is restarted.

In an embodiment, the DRM may include ranging report information/message for DS-TWR. In an embodiment, the ranging report information may include a First Round trip Time field and/or a Reply Time List field used to perform DS-TWR. In an embodiment, the Gate/PoS device may perform DS-TWR based on the DAM, RM and DRM to identify the distance to the mobile device.

An example of such an DRM is described below with reference to FIGS. 16A and 16B.

At operation 1250, the Gate/PoS device may transmit an FM to the Gate/PoS device(s). In an embodiment, when the Gate/PoS device successfully receives the DRM from the mobile device, the Gate/PoS device may transmit the FM to the corresponding mobile device. For example, based on the information included in the DRM and the result of UWB ranging based on DS-TWR, the Gate/PoS device may transmit the FM to the Gate/PoS device in the corresponding slot of the FM phase.

In an embodiment, IM and RM may be broadcasting messages, and DAM, DRM and FM may be unicast messages transmitted to a specific target. In an embodiment, the unicast message may include data for a service protocol (e.g., payment). If the service protocol is not terminated in the corresponding gate round, the remaining procedures may be processed in the next gate round (e.g., the gate round for the corresponding gate in the next block). In this case, a slot for the mobile device may be reserved for the next gate round, and the reserved slot may be marked as an occupied slot in the IM transmitted in the next gate round.

In an embodiment, the IM, DAM, RM, DRM, and FM used in the ranging procedure of FIG. 12 may be RFRAME (SP1 RFRAME) having the above-described SP1 packet configuration including Payload IE.

Figures 13C, 14A:
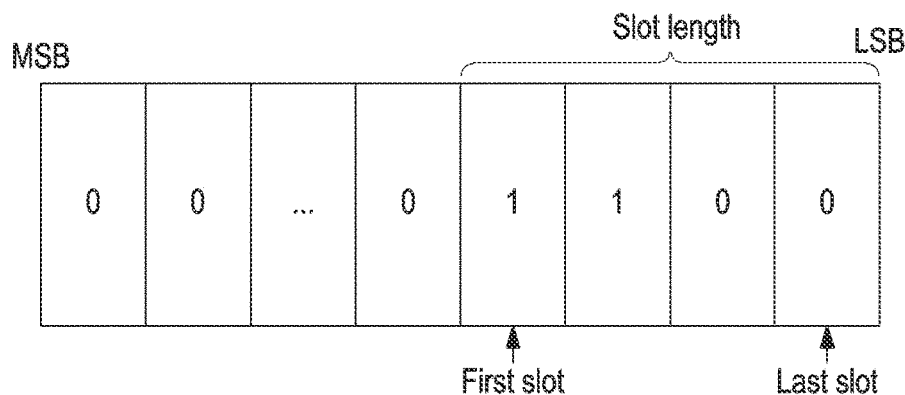

FIGS. 13A, 13B, and 13C illustrate a message structure of an IM according to various embodiments of the disclosure.

In the embodiment of FIGS. 13A to 13C, the IM is an example of the IM of FIG. 12 and may be, e.g., a message transmitted by the gate (or PoS) to initiate a ranging procedure. In an embodiment, the embodiment of FIGS. 13A to 13C may be the Content field of Payload IE for IM. In the disclosure, the IM may be referred to as a gate initiation message (GIM).

(1) Referring to FIG. 13A, the IM (GIM) may include a message ID field, a service protocol version field, a slot length field, a slot status field, and/or a slot information list field.

The message ID field may include a message ID (e.g., 0x01) for identifying the GIM message.

The service protocol version field may indicate the applet protocol version of the smart gate transaction used in this gate. In an embodiment, the service protocol version field may be used to exchange service versions available for the smart gate service. In an embodiment, the service protocol version field may be provided from a higher layer. In an embodiment, the service protocol version field may be the same as the service protocol version field of the gate in the BLE message.

The slot length field may indicate the number of DAM slots (slots included in the DAM phase/period) for multi-user access. In an embodiment, the range of the slot length field cannot exceed 23.

The slot status field may be a Bit mask for slots for DAMs.

The slot status field set to 0b0 may indicate empty. In other words, it may indicate that the corresponding slot is an empty slot (ranging slot in empty state). The empty slot may be, e.g., a slot that has not been selected (reserved) by the gate in the previous block (or, round) or a slot where the service protocol has been completed. The empty slot is used for a contention-based access (random access) or a contention-based ranging.

The slot status field set to 0b1 may indicate occupied. In other words, it may indicate that the corresponding slot is an occupied slot (ranging slot in occupied state). The occupied slot may be, e.g., a slot that has been selected (reserved) by the gate in the previous block (or, round) and the service protocol has not been ended yet (reserved). The occupied slot is used for a time-scheduled access (coordinated access) or a time-scheduled ranging.

In an embodiment, the slot status field may be reserved with, e.g., 16 bits. However, the bits actually used may range from the LSB to the slot length bits. For example, as shown in FIG. 13C, if the slot length is 0b0010 (i.e., 4), the first and second slots are occupied, and the third and fourth slots are empty, the slot status field is set to "0b0000000000001100".

The slot information list field may include information about each slot for DAM. Each element of the slot information list field may be as shown in FIG. 13B.

(2) The elements of the slot information list field may include an access condition field and/or a target mobile device ID field.

The access condition field may indicate an access condition for the slot.

0b0 . . . 000 (i.e., 0) indicates that no access condition is applied. In this case, all devices may attempt to connect.

0b0 . . . 001 to 0b1111 may be used to indicate the allowed distance between the gate and the device (mobile device) for transmitting the DAM as a response to the GIM.

The allowed distance may be calculated by the following equation.

$$allowed\ distance = (0.05 * Access\ Condition)\ meter$$

The default value may be 0b0001. (However, it may be changed depending on the environment of the gate or the accuracy of the D-TDoA system)

In this case, only devices within the allowed distance may transmit the DAM for this gate.

The target mobile device ID field may indicate the ID of the mobile device occupying this slot. For empty slots, this field may be set to 0.

In an embodiment, the gate may adaptively adjust the access condition for sending the DAM according to the number of occupied slots. For example, the gate may adaptively adjust each value of the access conditions for the empty slots according to the remaining number of empty slots or the number of occupied slots. For example, if only 10% of the slots are available, the gate may reduce the access condition (allowed distance) from 30 cm to 10 cm, so that only devices within 10 cm may send a DAM.

If all slots for DAM are empty, the gate may set the values of access conditions for all the slots to 0.

FIG. 14A illustrates a message structure of a DAM according to an embodiment of the disclosure.

In the embodiment of FIG. 14A, the DAM is an example of the DAM of FIG. 12 and may be, e.g., a message used for the mobile device (device) to participate in contention to communicate with the gate (or PoS). In an embodiment, the embodiment of FIG. 14A may be the Content field of Payload IE for DAM.

Referring to FIG. 14A, the DAM may include a message ID field, a service protocol version field, a reply time field, a data length field, and/or a data field.

The message ID field may include a message ID (e.g., 0x02) for identifying the DAM message.

The service protocol version field may indicate the applet protocol version of the mobile device.

The reply time field may indicate the reply time for DS-TWR. The reply time field may indicate a time difference between the reception time of the GIM and the transmission time of the DAM in the mobile device. The reply time field may be used for DS-TWR.

The data length field may indicate, e.g., the length of the data field in bytes.

The data field may contain additional data about the service protocol.

In an embodiment, since DS-TWR has not been yet performed at the time of transmitting the DAM, the device cannot accurately identify the distance between itself and the gate and thus does not transmit, to the gate, through the DAM, the information for specifying or identifying itself. The device then performs DS-TWR using the GIM, DAM, and GRM and precisely identifies the distance between the gate and the device. Then, if it becomes clear to communicate with the gate, the device may transmit its identification information and/or data through the DRM. The identification information transmitted through the DRM is information used only in a specific session and may be changed whenever the service is restarted. Thus, security may be maintained.

Figures 14B, 14C:
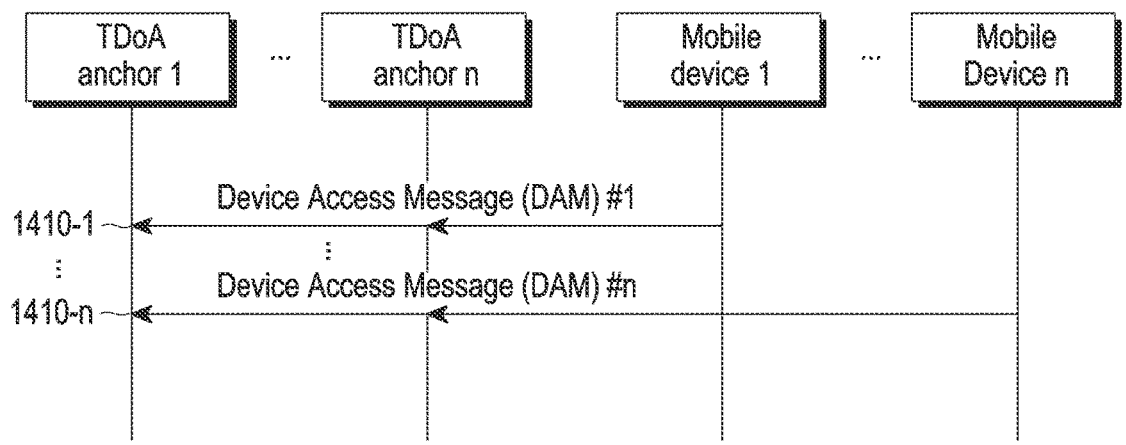
FIG. 14B illustrates a message structure of a DAM according to an embodiment of the disclosure.
FIG. 14C illustrates a method for performing Uplink time difference of arrival (TDoA) using the DAM of FIG. 14B according to an embodiment of the disclosure.

FIG. 14B illustrates a message structure of a DAM according to an embodiment of the disclosure.

In the embodiment of FIG. 14B, the DAM is an example of the DAM of FIG. 12 and may be, e.g., a message used for the mobile device (device) to participate in contention to communicate with the gate (or PoS), as well as used for UL-TDoA localization. In other words, the DAM of FIG. 14B corresponds to a message used for contention participation and UL-TDoA localization. In an embodiment, the embodiment of FIG. 14B may be the Content field of Payload IE for DAM.

Referring to FIG. 14B, the DAM may include a message ID field, a device ID field, a service protocol version field, a reply time field, a data length field, and/or a data field. In other words, the DAM of FIG. 14B may further include the device ID field for UL-TDoA localization as compared to the DAM of FIG. 14A.

The message ID field may include a message ID (e.g., 0x02) for identifying the DAM message.

The device ID field may include information (identification information) for identifying the mobile device.

In an embodiment, the device ID field may include the Mac address of the mobile device to identify the mobile device.

In another embodiment, the device ID field may include any value to identify the mobile device. As an embodiment, an arbitrary value for identifying the mobile device may be an arbitrary value generated at a specific time (e.g., the time of creation of the DAM). For example, an arbitrary value for identifying the mobile device may be portion of the transaction ID generated for the transaction by the secure component (e.g., an embedded secure element (eSE)) at the time of creation of the DAM. In this case, instead of obtaining unique information (e.g., MAC address) about the mobile device through the device ID field, the gate system obtains information for distinguishing the mobile device from other devices through the device ID field. Accordingly, when such an arbitrary value is used as identification information for identifying the mobile device, the privacy issue may be addressed.

The service protocol version field may indicate the applet protocol version of the mobile device.

The reply time field may indicate the reply time for DS-TWR. The reply time field may indicate a time difference between the reception time of the GIM and the transmission time of the DAM in the mobile device. The reply time field may be used for DS-TWR.

The data length field may indicate, e.g., the length of the data field in bytes.

The data field may contain additional data about the service protocol.

FIG. 14C illustrates a method for performing Uplink TDoA using the DAM of FIG. 14B according to an embodiment of the disclosure.

Referring to FIG. 14C, at operations 1410-1 to 1410-n, each mobile device 1, . . . n may transmit its own DAM in the DAM phase of the gate round. In this case, the DAM message may be a DAM including the device ID field of FIG. 14B. In other words, each mobile device may transmit a DAM including its own device ID field.

As an embodiment, the DAM period may include, e.g., a number of ranging slots corresponding to the maximum number (e.g., n) of mobile devices allowed in the corresponding round.

Each TDoA anchor (TDoA anchor 1, . . . , n) may receive (overhear) the DAM of each mobile device. As an embodiment, each TDoA anchor may be synchronized according to a preset synchronization scheme.

A specific TDoA anchor or a specific device controlling each TDoA anchor (e.g., the control device of the gate system of FIG. 7) may calculate the difference in arrival time between the DAM messages of the mobile device for the TDoA anchor pair. Based thereupon, the location of the mobile device may be estimated. The calculation of the difference in message arrival time and location calculation (estimation) may follow the TDoA scheme defined in IEEE 802.15.4z.

FIGS. 15A and 15B illustrate a message structure of an RM message according to various embodiments of the disclosure.

In the embodiment of FIGS. 15A and 15B, the RM is an example of the RM of FIG. 12 and may be, e.g., a message in which the gate (or PoS) replies to the DAM. In an embodiment, the embodiment of FIGS. 15A and 15B may be the Content field of Payload IE for RM. In the disclosure, the RM may be referred to as a gate replay message (GRM).

(1) Referring to FIG. 15A, the RM (GRM) may include a message ID field, a service protocol version field, a slot length field, a slot status field, a First Round trip Time filed, and/or a Reply Time List field.

The message ID field may include a message ID (e.g., 0x03) for identifying the GRM message.

The service protocol version field may indicate the version of the service protocol used in this gate.

Slot length field:

The slot length field set to 0x00 may indicate that the GRM is transmitted from a sub anchor.

The slot length field set to 0x01 to 0x17 may indicate the number of DAM slots for multi-user access (that is, N of the Reply time list field).

Through the slot length field, the device may identify whether the anchor of the gate transmitting the GRM is the main anchor or the sub anchor.

The slot status field may be a Bit mask for slots for DAMs.

The slot status field set to 0b0 may indicate that the DAM is not successfully received (in the corresponding DAM slot).

The slot status field set to 0b1 may indicate that the DAM is successfully received (in the corresponding DAM slot).

In an embodiment, the device may identify whether the DAM transmitted implicitly through the slot status field of the GRM is successfully received by the gate.

The First Round trip Time field may indicate the round trip time between the GIM and the first successful DAM. In an embodiment, the First Round trip Time field may indicate a time difference between the transmission time of the GIM from the gate and the first successful DAM reception time (the reception time of the first successfully received DAM).

The Reply Time List field may include a list of reply times for mobile devices. Each element of the Reply Time List field may be as shown in FIG. 15B.

(2) The element of the Reply Time List field may include a Reply Time field.

The Reply Time field may indicate the reply time for the mobile device. In the case of an empty slot, the Reply Time field may be set to 0x00 (i.e., 0). For example, if the DAM is not successfully received, the Reply Time field may be set to 0.

In an embodiment, only the anchor having transmitted the GIM (main anchor) among the anchors of the gate may include the slot status field, the First Round trip Time field, and/or the Reply Time List field in the GRM and transmit it. Other sub anchors may transmit the GRM without including, in the GRM, the slot status field, the First Round trip Time field, and/or the Reply Time List field. In this case, the sub anchors may set the value of the slot length field to 0x00 (i.e., 0).

In an embodiment, the device may perform DS-TWR by using the First Round Trip Time field and the Reply Time List field included in the GRM. Thus, the distance between the device and the gate (or the main anchor of the gate) may be identified.

FIGS. 16A and 16B illustrate a message structure of an DRM according to various embodiments of the disclosure.

In the embodiment of FIGS. 16A and 16B, the DRM is an example of the DRM of FIG. 12 and may be, e.g., a message transmitted after the device identifies the distance from the gate (or PoS) by performing DS-TWR. Accordingly, the DRM may include identification information (ID) about the device. As described above, the identification information transmitted through the DRM is information used only in a specific session and may be changed whenever the service is restarted. In an embodiment, the embodiment of FIGS. 16A and 16B may be the Content field of Payload IE for DRM.

(1) Referring to FIG. 16A, the DRM may include a message ID field, a device ID field, a First Round trip Time field, a gate anchor number field, a Reply Time List field, a data length field, and/or a data field.

The message ID field may include a message ID (e.g., 0x04) for identifying the DRM message.

The device ID field may indicate the ID of the mobile device. Thus, the device transmitting the DRM may be identified.

The First Round trip Time field may indicate the Round trip time between the DAM of the mobile device and the first GRM. In an embodiment, the First Round trip Time field may indicate a time difference between the transmission time of the DAM from the mobile device and the reception time of the first GRM from the gate (the reception time of the first successfully received GRM from the gate).

The gate anchor number field may indicate the number of anchors in the gate (i.e., k of the Reply time list field). In an embodiment, k may not exceed two.

The Reply Time List field may include a list of reply times for the gate for each GRM. Each element of the Reply Time List field may be as shown in FIG. 16B.

The data length field may indicate, e.g., the length of the data field in bytes.

The data field may contain additional data about the service protocol.

(2) The element of the Reply Time List field may include a Reply Time field.

The Reply Time field may indicate the reply time for the nth GRM. The Reply Time field may indicate a time difference between the reception time of the nth GRM and the transmission time of the DRM in the mobile device.

In an embodiment, the gate (each anchor of the gate) may perform DS-TWR by using the First Round Trip Time field and the Reply Time List field included in the DRM. Thus, the distance between the device and the gate (or each anchor of the gate) may be identified.

FIG. 17 illustrates a message structure of an FM according to an embodiment of the disclosure.

In the embodiment of FIG. 17, the FM is an example of the FM of FIG. 12, and may be, e.g., a message that the gate (or PoS) transmits as a result of performing DS-TWR using the DAM, GRM, and DRM. In an embodiment, the embodiment of FIG. 17 may be the Content field of Payload IE for FM. In the disclosure, the FM may be referred to as a gate final message (GFM).

Referring to FIG. 17, the FM (FRM) may include a message ID field, a device ID field, a result field, a data length field, and/or a data field.

The message ID field may include a message ID (e.g., 0x05) for identifying the GRM message.

The device ID field may indicate the ID of the mobile device.

The result field may indicate the result of UWB ranging.
The result field may indicate whether the mobile device is close enough to the gate to perform the service protocol.

The result field set to 0x00 may indicate that the mobile device is within the range. In other words, it may indicate that the mobile device identified by the device ID field is within the range.

The result field set to 0x01 may indicate that the mobile device is not within the range and the occupied slot will be released in the next round. The next round may be, e.g., a round for the corresponding gate of the next block.

The data length field may indicate, e.g., the length of the data field in bytes.

The data field may contain additional data about the service protocol.

In an embodiment, GFM corresponds to the unicast message transmitted to a specific device. Therefore, the gate may include data for the service protocol in the GFM and transmit it. Since the remaining messages (GIM. GRM) transmitted by the gate are broadcast messages, the gate may transmit the service protocol data only through the unicast message, GFM.

Figure 18:
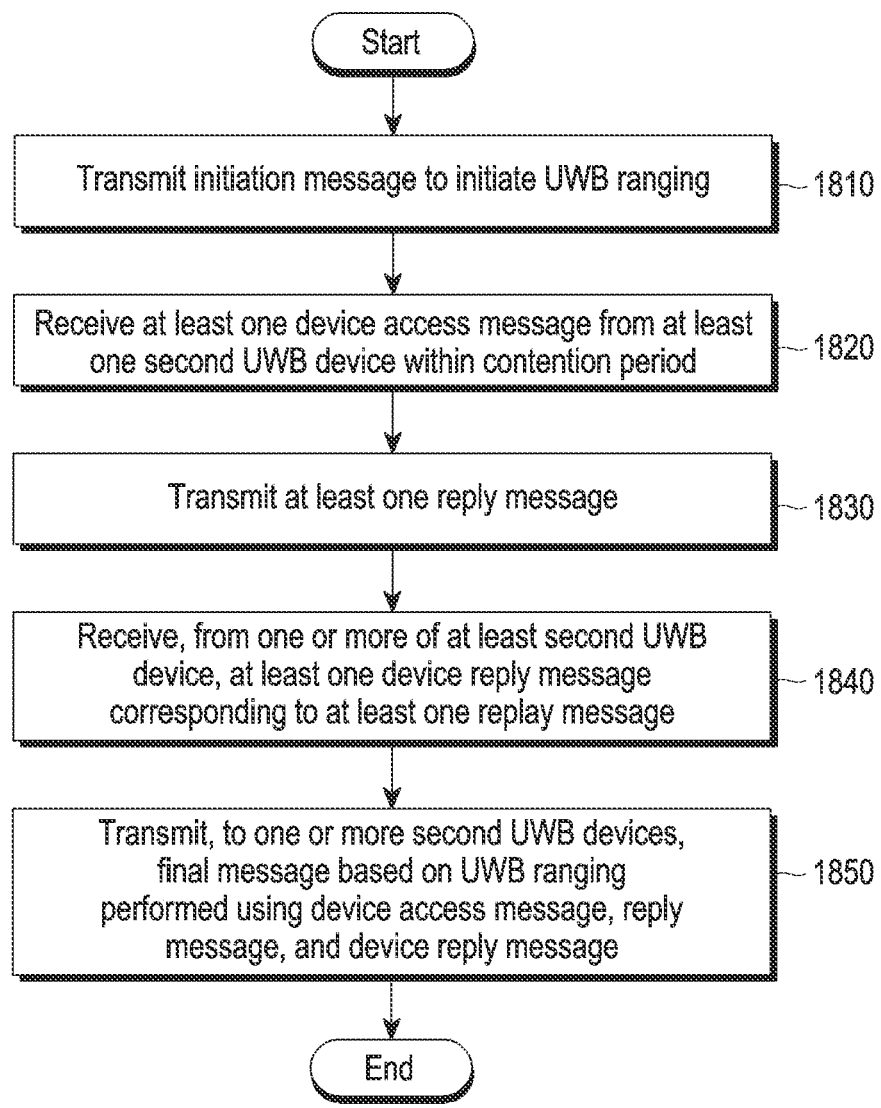
FIG. 18 is a flowchart illustrating a method of a first UWB device according to an embodiment of the disclosure.

FIG. 18 is a flowchart illustrating a method of a first UWB device according to an embodiment of the disclosure.

In the embodiment of FIG. 18, the first UWB device may be, e.g., the initiator (e.g., gate device or PoS device) of FIG. 9, and the second UWB device may be, e.g., the responder (e.g., user's mobile device) of FIG. 9. In relation to FIG. 18, no duplicate description is given of those described above in connection with FIGS. 1, 2, 3A, 3B, 4, 5A, 5B, 6 to 12, and 13A to 13C.

Referring to FIG. 18, the first UWB device may transmit an initiation message (IM) for initiating UWB ranging at operation 1810. The transmission/reception operation of the initiation message may follow, e.g., operation 1210 of FIGS. 12 and 13A to 13C.

The first UWB device may receive at least one device access message (DAM) from the at least one second UWB device within the contention period at operation 1820. The transmission/reception operation of the device access message may follow, e.g., operation 1220 of FIGS. 12, 14A, and 14B.

The first UWB device may transmit at least one reply message at operation 1830. The transmission/reception operation of the reply message may follow, e.g., operation 1230 of FIGS. 12, 15A, and 15B.

The first UWB device may receive at least one device reply message (DRM) corresponding to the at least one reply message from one or more of the at least one second UWB device at operation 1840. The transmission/reception operation of the device reply message may follow, e.g., operation 1240 of FIGS. 12, 16A, and 16B.

The first UWB device may transmit a final message based on the UWB ranging performed using the device access message, the reply message, and the device reply message at operation 1850. The transmission/reception operation of the final message may follow, e.g., operation 1250 of FIGS. 12 and 17.

In an embodiment, the information about the state of the ranging slot included in the contention period may indicate whether each ranging slot included in the contention period is the empty state or occupied state, and the information about the access condition of the ranging slot may indicate the access condition for each ranging slot included in the contention period.

In an embodiment, the information about the access condition of the ranging slot may be set to one of a first value indicating that there is no access condition applied to the corresponding ranging slot or a second value indicating the allowed distance between the first UWB device and the second UWB device to transmit the device access message in response to the initiation message.

In an embodiment, the reply message may include slot length information. The slot length information may be set to one of a first value indicating that the reply message is transmitted from the sub anchor or a second value indicating the number of ranging slots included in the contention period.

In an embodiment, the reply message may include information indicating whether the device access message is successfully received in the ranging slot included in the contention period.

In an embodiment, the device reply message may include information for identifying the second UWB device transmitting the device reply message.

In an embodiment, the device reply message may include information indicating the number of anchors of the first UWB device.

Figure 19:
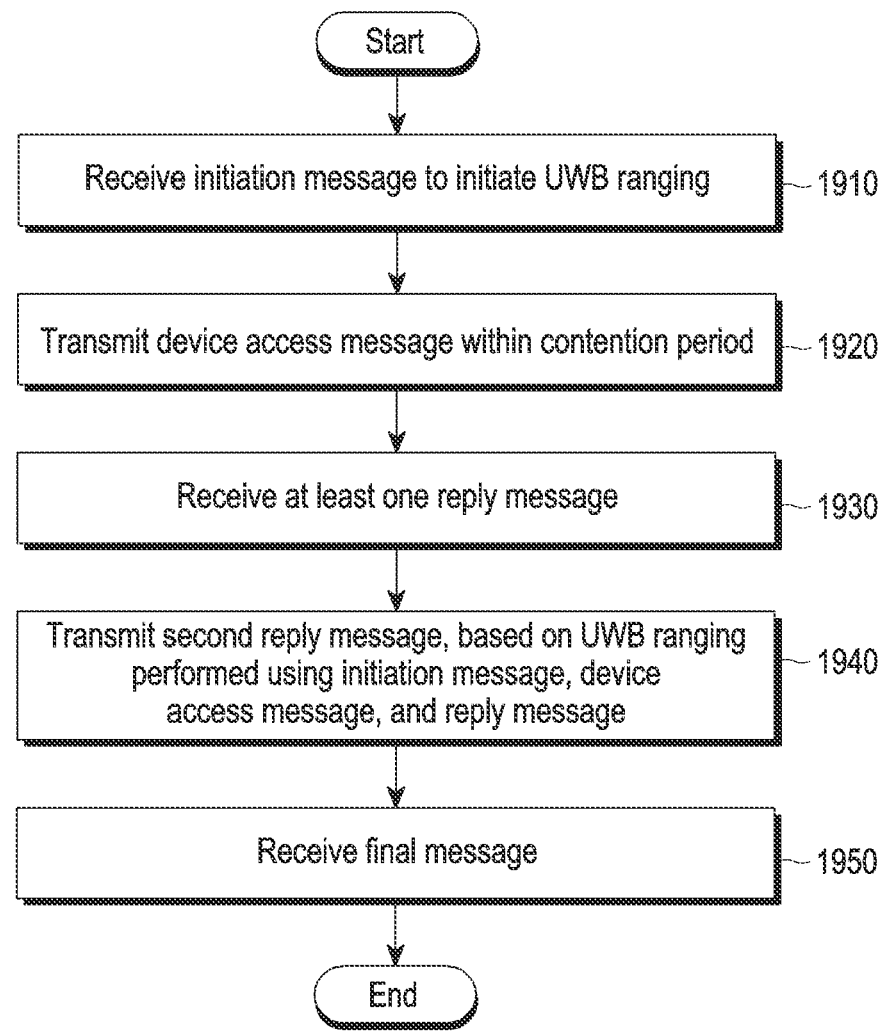
FIG. 19 is a flowchart illustrating a method of a second UWB device according to an embodiment of the disclosure.

FIG. 19 is a flowchart illustrating a method of a second UWB device according to an embodiment of the disclosure.

Referring to FIG. 19, the first UWB device may be, e.g., the initiator (e.g., gate device or PoS device) of FIG. 9, and the second UWB device may be, e.g., the responder (e.g., user's mobile device) of FIG. 9. In relation to FIG. 19, no duplicate description is given of those described above in connection with FIGS. 1, 2, 3A, 3B, 4, 5A, 5B, 6 to 12, and 13A to 13C.

The second UWB device may receive an initiation message for initiating UWB ranging from the first UWB device at operation 1910. The transmission/reception operation of the initiation message may follow, e.g., operation 1210 of FIGS. 12 and 13A to 13C.

The second UWB device may transmit a device access message to the first UWB device within the contention period at operation 1920. The transmission/reception operation of the device access message may follow, e.g., operation 1220 of FIGS. 12, 14A, and 14B.

The second UWB device may receive at least one reply message from the first UWB device at operation 1930. The transmission/reception operation of the reply message may follow, e.g., operation 1240 of FIGS. 12, 15A, and 15B.

The second UWB device may transmit a device reply message, based on the UWB ranging performed using the initiation message, device access message, and reply message, to the first UWB device at operation 1940. The transmission/reception operation of the device reply message may follow, e.g., operation 1240 of FIGS. 12, 16A, and 16B.

The second UWB device may receive a final message from the first UWB device at operation 1950. The transmission/reception operation of the final message may follow, e.g., operation 1250 of FIGS. 12 and 17.

In an embodiment, the information about the state of the ranging slot included in the contention period may indicate whether each ranging slot included in the contention period is the empty state or occupied state, and the information about the access condition of the ranging slot may indicate the access condition for each ranging slot included in the contention period.

In an embodiment, the information about the access condition of the ranging slot may be set to one of a first value indicating that there is no access condition applied to the corresponding ranging slot or a second value indicating the allowed distance between the first UWB device and the second UWB device to transmit the device access message in response to the initiation message.

In an embodiment, the reply message may include slot length information. The slot length information may be set to one of a first value indicating that the reply message is transmitted from the sub anchor or a second value indicating the number of ranging slots included in the contention period.

In an embodiment, the reply message may include information indicating whether the device access message is successfully received in the ranging slot included in the contention period.

In an embodiment, the device reply message may include information for identifying the second UWB device transmitting the device reply message.

In an embodiment, the device reply message may include information indicating the number of anchors of the first UWB device.

Figure 20:
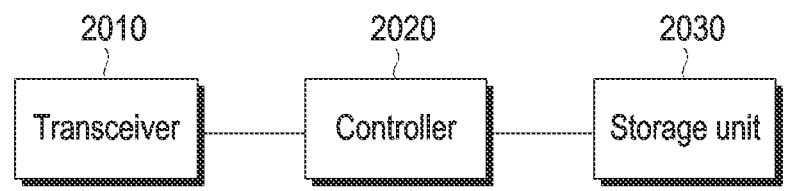
FIG. 20 is a view illustrating a structure of an electronic device according to an embodiment of the disclosure.

FIG. 20 is a view illustrating a structure of an electronic device according to an embodiment of the disclosure.

In the embodiment of FIG. 20, the electronic device may correspond to a UWB device, include a UWB device, or may be an electronic device that may include a portion of a UWB device. For example, the electronic device may be the UWB device of FIG. 1, the first UWB device/second UWB device of FIG. 2, the mobile device of FIG. 7, the gate (gate device) of FIG. 7, or the TDoA anchor of FIG. 7.

Referring to FIG. 20, the electronic device may include a transceiver 2010, a controller 2020, and a storage unit 2030. In the disclosure, the controller may be defined as a circuit or application-specific integrated circuit or at least one processor.

The transceiver 2010 may transmit and receive signals to/from another entity. The transceiver 2010 may transmit/receive data to/from another device through, e.g., UWB communication and/or OOB communication (e.g., BLE).

The controller 2020 may control the overall operation of the electronic device according to an embodiment. For example, the controller 2020 may control inter-block signal flow to perform the operations according to the above-described flowchart. Specifically, the controller 2020 may control the operations (e.g., the operations of the application and/or framework) of the electronic device described above with reference to FIGS. 1, 2, 3A, 3B, 4, 5A, 5B, 6 to 12, 13A to 13C, 14A to 14C, 15A, 15B, 16A, 16B, and 17 to 19.

The storage unit 2030 may store at least one of information transmitted/received via the transceiver 2010 and information generated via the controller 2020. For example, the storage unit 2030 may store information and data necessary for the method described above with reference to FIGS. 1, 2, 3A, 3B, 4, 5A, 5B, 6 to 12, 13A to 13C, 14A to 14C, 15A, 15B, 16A, 16B, and 17 to 19. In an embodiment, the storage unit may include the above-described secure component.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by a first ultra-wide band (UWB) device, the method comprising:
    transmitting an initiation message for initiating UWB ranging in a first period of a first ranging round;
    receiving, from at least one second UWB device, at least one device access message in a second period of the first ranging round;
    transmitting a reply message in a third period of the first ranging round;
    receiving, from one or more of the at least one second UWB device, at least one device reply message corresponding to the reply message in a fourth period of the first ranging round; and
    transmitting, to the one or more second UWB device, at least one final message in a fifth period of the first ranging round, the at least one final message being generated based on UWB ranging performed using the at least one device access message, the reply message, and the at least one device reply message,
    wherein the initiation message includes length information indicating a number of ranging slots in the second period, and status information indicating whether each of the ranging slots included in the second period is an empty slot or an occupied slot,
    wherein the empty slot is available for a contention-based access and the occupied slot is scheduled for a known UWB device,
    wherein the initiation message includes at least one identification (ID) of at least one known UWB device which participates in contention in an empty slot of a previous ranging round and the empty slot of the previous ranging round is set as the occupied slot of the first ranging round, and
    wherein the status information includes a bit mask.

2. The method of claim 1,
    wherein the initiation message further includes access condition information indicates an access condition for each ranging slot included in the second period, and
    wherein the access condition information is set to one of a first value indicating that there is no access condition applied to a corresponding ranging slot or a second value indicating an allowed distance between the first UWB device and the second UWB device to transmit the at least one device access message in response to the initiation message.

3. The method of claim 1,
wherein the reply message includes slot length information, and
wherein the slot length information is set to one of a first value indicating that the reply message is transmitted from a sub anchor or a second value indicating a number of ranging slots included in the second period.

4. The method of claim 1, wherein the reply message includes information indicating whether the at least one device access message is successfully received in a ranging slot included in the second period.

5. The method of claim 1, wherein the at least one device reply message includes information for identifying the second UWB device transmitting the at least one device reply message.

6. The method of claim 1, wherein the at least one device reply message includes information indicating a number of anchors associated with the first UWB device.

7. The method of claim 6,
wherein the anchors further comprise a bluetooth low energy (BLE) anchor disposed in a separate location from at least one time difference of arrival (TDoA) anchor.

8. The method of claim 6,
wherein the anchors include at least one time difference of arrival (TDoA) anchor performing an operation for TDoA localization, and
wherein the TDoA localization is performed using one way ranging (OWR).

9. The method of claim 1, wherein the at least one final message includes:
identification information for identifying the second UWB device transmitting the at least one device reply message; and
information about a result of UWB ranging performed by the first UWB device based on the at least one device access message, the reply message, and the at least one device reply message.

10. A method by a second ultra-wide band (UWB) device, the method comprising:
receiving, from a first UWB device, an initiation message for initiating UWB ranging in a first period of a first ranging round;
transmitting, to the first UWB device, a device access message in a second period of the first ranging round;
receiving, from the first UWB device, a reply message in a third period of the first ranging round;
transmitting, to the first UWB device, a device reply message in a fourth period of the first ranging round, the device reply message being generated based on UWB ranging performed using the initiation message, the device access message, and the reply message; and
receiving, from the first UWB device, a final message in a fifth period of the first ranging round,
wherein the initiation message includes length information indicating a number of ranging slots in the second period, and status information indicating whether each of the ranging slots included in the second period is an empty slot or an occupied slot,
wherein the empty slot is available for a contention-based access and the occupied slot is scheduled for a known UWB device,
wherein the initiation message includes at least one identification, ID, of at least one known UWB device which participates in contention in an empty slot of a previous ranging round and the empty slot of the previous ranging round is set as the occupied slot of the first ranging round, and
wherein the status information includes a bit mask.

11. The method of claim 10,
wherein the initiation message further includes access condition information indicates an access condition for each ranging slot included in the second period, and
wherein the access condition information is set to one of a first value indicating that there is no access condition applied to a corresponding ranging slot or a second value indicating an allowed distance between the first UWB device and the second UWB device to transmit the device access message in response to the initiation message.

12. The method of claim 10,
wherein the reply message includes slot length information, and
wherein the slot length information is set to one of a first value indicating that the reply message is transmitted from a sub anchor or a second value indicating a number of ranging slots included in the second period.

13. The method of claim 10, wherein the reply message includes information indicating whether the device access message is successfully received in the ranging slot included in a contention period.

14. The method of claim 10, wherein the device reply message includes information for identifying the second UWB device transmitting the device reply message.

15. The method of claim 14, wherein the device reply message includes information indicating a number of anchors associated with the first UWB device.

16. The method of claim 10, wherein the final message includes:
identification information for identifying the second UWB device transmitting the device reply message; and
information about a result of UWB ranging performed by the first UWB device based on the device access message, the reply message, and the device reply message.

17. A first ultra-wide band (UWB) device, the first UWB device comprising:
a transceiver; and
a controller operationally connected with the transceiver, wherein the controller is configured to:
transmit an initiation message for initiating UWB ranging in a first period of a first ranging round,
receive, from at least one second UWB device, at least one device access message in a second period of the first ranging round,
transmit a reply message in a third period of the first ranging round,
receive, from one or more of the at least one second UWB device, at least one device reply message corresponding to the reply message in a fourth period of the first ranging round, and
transmit, to the one or more second UWB device, at least one final message in a fifth period of the first ranging round, the at least one final message being generated based on UWB ranging performed using the at least one device access message, the reply message, and the at least one device reply message,
wherein the initiation message includes length information indicating a number of ranging slots in the second period, and status information indicating whether each of the ranging slots included in the second period is an empty slot or an occupied slot, wherein the empty slot is available for a contention-based access and the occupied slot is scheduled for a known UWB device, wherein the initiation message includes at least one identification, ID, of at least one known UWB device which participates in contention in an empty slot of a previous ranging round and the empty slot of the previous ranging round is set as the occupied slot of the first ranging round, and wherein the status information includes a bit mask.

18. A second ultra-wide band (UWB) device, the second UWB device comprising:

a transceiver; and a controller operationally connected with the transceiver, wherein the controller is configured to:
  receive, from a first UWB device, an initiation message for initiating UWB ranging in a first period of a first ranging round,
  transmit, to the first UWB device, a device access message in a second period of the first ranging round,
  receive, from the first UWB device, a reply message in a third period of the first ranging round,
  transmit, to the first UWB device, a device reply message in a fifth period of the first ranging round based on UWB ranging performed using the initiation message, the device access message, and the reply message, and
  receive, from the first UWB device, a final message in the fifth period of the first ranging round, wherein the initiation message includes length information indicating a number of ranging slots in the second period, and status information indicating whether each of the ranging slots included in the second period is an empty slot or an occupied slot, wherein the empty slot is available for a contention-based access and the occupied slot is scheduled for a known UWB device, wherein the initiation message includes at least one identification, ID, of at least one known UWB device which participates in contention in an empty slot of a previous ranging round and the empty slot of the previous ranging round is set as the occupied slot of the first ranging round, and wherein the status information includes a bit mask.

* * * * *